US012790459B2

(12) United States Patent
Nakamichi et al.

(10) Patent No.: US 12,790,459 B2
(45) Date of Patent: Nov. 10, 2026

(54) BORON NITRIDE PARTICLES, COMPOSITION FOR FORMING THERMALLY CONDUCTIVE MATERIAL, THERMALLY CONDUCTIVE MATERIAL, THERMALLY CONDUCTIVE SHEET, AND DEVICE WITH THERMALLY CONDUCTIVE LAYER

(71) Applicant: FUJIFILM Corporation, Tokyo (JP)

(72) Inventors: Aki Nakamichi, Kanagawa (JP); Takuya Kitamura, Kanagawa (JP); Kengo Saito, Kanagawa (JP); Daigo Murai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1012 days.

(21) Appl. No.: 17/848,893

(22) Filed: Jun. 24, 2022

(65) Prior Publication Data

US 2022/0332921 A1 Oct. 20, 2022

Related U.S. Application Data

(63) Continuation of application No. PCT/JP2020/045648, filed on Dec. 8, 2020.

(30) Foreign Application Priority Data

Dec. 26, 2019 (JP) ................................ 2019-237335

(51) Int. Cl.
*C08K 3/38* (2006.01)
*C01B 21/064* (2006.01)

(52) U.S. Cl.
CPC ............ *C08K 3/38* (2013.01); *C01B 21/0648* (2013.01); *C08K 2003/385* (2013.01); *C08K 2201/001* (2013.01)

(58) Field of Classification Search
CPC ................ C08K 3/38; C08K 2003/385; C08K 2201/001; C01B 21/0648; C01P 2002/72
See application file for complete search history.

(56) References Cited

U.S. PATENT DOCUMENTS

| | | | |
|---|---|---|---|
| 2019/0071360 | A1 | 3/2019 | Shin et al. |
| 2019/0225494 | A1 | 7/2019 | Daiki et al. |

FOREIGN PATENT DOCUMENTS

| | | | |
|---|---|---|---|
| JP | 09-012771 | A | 1/1997 |
| JP | 2010-076956 | A | 4/2010 |
| JP | 2015-137335 | A | 7/2015 |
| JP | 2017-036415 | A | 2/2017 |
| JP | 2017-095292 | A | 6/2017 |
| JP | 2019-515864 | A | 6/2019 |
| JP | 2019-206455 | A | 12/2019 |
| JP | 2019-206456 | A | 12/2019 |
| WO | 2013/046784 | A1 | 4/2013 |
| WO | 2018/101241 | A1 | 6/2018 |

OTHER PUBLICATIONS

JP2015137335A_Machine_Translation_ Description_Claims (Year: 2015).*

Andriani, Y.; et al., Green and efficient production of boron nitride nanosheets via oxygen doping-facilated liquid exfoliation, Ceramics International 45, Mar. 2019, 4909-4917 (Year: 2019).*

Hou, J.; et al., Preparation and characterization of surface modified boron nitride epoxy composites with enhanced thermal conductivity, RSC Adv., 2014, 4, 44282-44290 (Year: 2014).*

Japanese Office Action dated Apr. 4, 2023 in Japanese Application No. 2021-567181.

International Search Report dated Feb. 16, 2021 from the International Searching Authority in International Application No. PCT/JP2020/045648.

Written Opinion dated Feb. 16, 2021 from the International Searching Authority in International Application No. PCT/JP2020/045648.

International Preliminary Report on Patentability with the translation of Written Opinion dated Jun. 28, 2022 from the International Bureau in International Application No. PCT/JP2020/045648.

* cited by examiner

*Primary Examiner* — Christina A Johnson
(74) *Attorney, Agent, or Firm* — Sughrue Mion, PLLC

(57) ABSTRACT

The present invention provides boron nitride particles that can be used for preparation of a thermally conductive material having excellent thermally conductive properties and peel strength. In addition, the present invention provides a composition for forming a thermally conductive material, a thermally conductive material, a thermally conductive sheet, and a device with a thermally conductive layer, in relation to the boron nitride particles. In the boron nitride particles of the present invention, an atomic concentration ratio of oxygen atomic concentration to boron atomic concentration on a surface, detected by X-ray photoelectron spectroscopy, is 0.12 or greater, and a D value obtained by Equation (1) is 0.010 or less.

$$D\ value = B(OH)_3(002)/BN(002) \quad \text{Equation (1)}$$

$B(OH)_3(002)$: Peak strength derived from a (002) plane of boron hydroxide having a triclinic space group measured by X-ray diffraction $BN(002)$: Peak strength derived from the (002) plane of boron nitride having a hexagonal space group measured by X-ray diffraction.

22 Claims, No Drawings

BORON NITRIDE PARTICLES, COMPOSITION FOR FORMING THERMALLY CONDUCTIVE MATERIAL, THERMALLY CONDUCTIVE MATERIAL, THERMALLY CONDUCTIVE SHEET, AND DEVICE WITH THERMALLY CONDUCTIVE LAYER

CROSS-REFERENCE TO RELATED APPLICATIONS

This application is a Continuation of PCT International Application No. PCT/JP2020/045648 filed on Dec. 8, 2020, which claims priority under 35 U.S.C. § 119(a) to Japanese Patent Application No. 2019-237335 filed on Dec. 26, 2019. Each of the above applications is hereby expressly incorporated by reference, in its entirety, into the present application.

BACKGROUND OF THE INVENTION

1. Field of the Invention

The present invention relates to boron nitride particles, a composition for forming a thermally conductive material, a thermally conductive material, a thermally conductive sheet, and a device with a thermally conductive layer.

2. Description of the Related Art

In recent years, a power semiconductor device used in various electrical machines such as a personal computer, a general household electric appliance, and an automobile has been rapidly miniaturized. With the miniaturization, it is difficult to control heat generated from the power semiconductor device having a high density.

In order to deal with such a problem, a thermally conductive material, which promotes heat dissipation from the power semiconductor device, is used.

In addition, boron nitride particles may be used to improve the thermally conductive material of such a thermally conductive material.

For example, JP1997-012771A (JP-H09-012771A) discloses "a filler characterized by heating boron nitride in an oxidizing atmosphere to increase a weight by 1% by weight or greater and 40% by weight or less (claim 1)".

SUMMARY OF THE INVENTION

The present inventors examined a thermally conductive material using boron nitride disclosed in JP1997-012771A, and found that there is room for improvement mainly in the thermally conductive properties.

In addition, the thermally conductive material is also required to have a sufficiently high peel (peeling) strength when being adhered to an object (adherend) that transfers heat.

Therefore, an object of the present invention is to provide boron nitride particles that can be used for preparing a thermally conductive material having excellent thermally conductive properties and peel strength. In addition, another object of the present invention is to provide a composition for forming a thermally conductive material, a thermally conductive material, a thermally conductive sheet, and a device with a thermally conductive layer in relation to the boron nitride particles.

As a result of a thorough examination conducted to achieve the objects, the present inventors found that the objects can be achieved by the following configuration.

[1]

Boron nitride particles in which an atomic concentration ratio of an oxygen atomic concentration to a boron atomic concentration on a surface, detected by X-ray photoelectron spectroscopy, is 0.12 or greater, and a D value obtained by Equation (1) is 0.010 or less.

$$\text{D value}=B(OH)_3(002)/BN(002) \qquad \text{Equation (1)}$$

$B(OH)_3(002)$: Peak strength derived from a (002) plane of boron hydroxide having a triclinic space group measured by X-ray diffraction.

BN(002): Peak strength derived from the (002) plane of boron nitride having a hexagonal space group measured by X-ray diffraction.

[2]

The boron nitride particles as described in [1], in which the D value is 0.005 or less.

[3]

The boron nitride particles as described in [1] or [2], in which the atomic concentration ratio is 0.15 or greater.

[4]

The boron nitride particles as described in any one of [1] to [3], in which the atomic concentration ratio is 0.25 or less.

[5]

The boron nitride particles as described in any one of [1] to [4], which has an average particle diameter of 40 μm or greater.

[6]

The boron nitride particles as described in any one of [1] to [5], which are aggregated particles.

[7]

The boron nitride particles as described in any one of [1] to [6], in which the boron nitride is subjected to oxygen plasma treatment.

[8]

A composition for forming a thermally conductive material including the boron nitride particles as described in any one of [1] to [7] and a resin binder or a precursor thereof.

[9]

The composition for forming a thermally conductive material as described in [8], in which the resin binder or the precursor thereof contains an epoxy compound.

[10]

The composition for forming a thermally conductive material as described in [8] or [9], in which the resin binder or the precursor thereof contains an epoxy compound and a phenolic compound.

[11]

A thermally conductive material which is obtained by curing the composition for forming a thermally conductive material as described in any one of [8] to [10].

[12]

A thermally conductive sheet made of the thermally conductive material as described in [11].

[13]

A device with a thermally conductive layer including a device and a thermally conductive layer including the thermally conductive sheet as described in [12] disposed on the device.

Therefore, the present invention can provide boron nitride particles that can be used for preparing a thermally conductive material having excellent thermally conductive properties and peel strength. In addition, it is possible to provide a composition for forming a thermally conductive material, a thermally conductive material, a thermally conductive sheet, and a device with a thermally conductive layer, in relation to the boron nitride particles.

DESCRIPTION OF THE PREFERRED EMBODIMENTS

Hereinafter, the boron nitride particles and the composition for forming a thermally conductive material according to an embodiment of the present invention will be described in detail.

The following constituent prerequisites are described based on the representative embodiments of the present invention in some cases, but the present invention is not limited to such an embodiment.

Moreover, in the present specification, the numerical range expressed using "to" means a range including the numerical values listed before and after "to" as a lower limit value and an upper limit value.

Furthermore, in the present specification, the description of "(meth)acryloyl group" means "either or both of an acryloyl group and a methacryloyl group". Moreover, the description of "(meth)acrylamide group" means "either or both of an acrylamide group and a methacrylamide group".

In the present specification, an acid anhydride group may be a monovalent group or a divalent group. In a case where the acid anhydride group represents a monovalent group, examples of the monovalent group include a substituent obtained by removing any hydrogen atom from an acid anhydride such as maleic acid anhydride, phthalic acid anhydride, pyromellitic acid anhydride, and trimellitic acid anhydride.

Moreover, in a case where the acid anhydride group represents a divalent group, the divalent group means a group represented by *—CO—O—CO—* (* represents a bonding position).

In addition, in the present specification, a substituent or the like, which is not specified whether to be substituted or unsubstituted, may have an additional substituent (for example, a substituent group Y which will be described later), if possible, as long as the desired effect is not impaired. For example, the description of an "alkyl group" means a substituted or unsubstituted alkyl group (alkyl group that may have a substituent) as long as the desired effect is not impaired.

Furthermore, in the present specification, in a case where the description of "may have a substituent" appears, the kind of a substituent, the position of a substituent, and the number of substituents are not particularly limited. Examples of the number of substituents include 1 or 2 or more. Examples of the substituent include a monovalent nonmetallic atomic group excluding a hydrogen atom, and the substituent is preferably a group selected from the following substituent group Y.

In the present specification, examples of a halogen atom include a chlorine atom, a fluorine atom, a bromine atom, and an iodine atom.

Substituent Group Y:

a halogen atom (—F, —Br, —Cl, —I, or the like), a hydroxyl group, an amino group, a carboxylic acid group and a conjugated base group thereof, a carboxylic acid anhydride group, a cyanate ester group, an unsaturated polymerizable group, an epoxy group, an oxetanyl group, an aziridinyl group, a thiol group, an isocyanate group, an thioisocyanate group, an aldehyde group, an alkoxy group, an aryloxy group, an alkylthio group, an arylthio group, an alkyldithio group, an aryldithio group, an N-alkylamino group, an N,N-dialkylamino group, an N-arylamino group, an N,N-diarylamino group, an N-alkyl-N-arylamino group, an acyloxy group, a carbamoyloxy group, an N-alkylcarbamoyloxy group, an N-arylcarbamoyloxy group, an N,N-dialkylcarbamoyloxy group, an N,N-diarylcarbamoyloxy group, an N-alkyl-N-arylcarbamoyloxy group, an alkylsulfoxy group, an arylsulfoxy group, an acylthio group, an acylamino group, an N-alkylacylamino group, an N-arylacylamino group, a ureido group, an N'-alkylureido group, an N',N'-dialkylureido group, an N'-arylureido group, an N',N'-diarylureido group, an N'-alkyl-N'-arylureido group, an N-alkylureido group, an N-arylureido group, an N'-alkyl-N-alkylureido group, an N'-alkyl-N-arylureido group, an N',N'-dialkyl-N-alkylureido group, an N',N'-dialkyl-N-arylureido group, an N'-aryl-N-alkylureido group, an N'-aryl-N-arylureido group, an N',N'-diaryl-N-alkylureido group, an N',N'-diaryl-N-arylureido group, an N'-alkyl-N'-aryl-N-alkylureido group, an N'-alkyl-N'-aryl-N-arylureido group, an alkoxycarbonylamino group, an aryloxycarbonylamino group, an N-alkyl-N-alkoxycarbonylamino group, an N-alkyl-N-aryloxycarbonylamino group, an N-aryl-N-alkoxycarbonylamino group, an N-aryl-N-aryloxycarbonylamino group, a formyl group, an acyl group, an alkoxycarbonyl group, an aryloxycarbonyl group, a carbamoyl group, an N-alkylcarbamoyl group, an N,N-dialkylcarbamoyl group, an N-arylcarbamoyl group, an N,N-diarylcarbamoyl group, an N-alkyl-N-arylcarbamoyl group, an alkylsulfinyl group, an arylsulfinyl group, an alkylsulfonyl group, an arylsulfonyl group, a sulfo group ($—SO_3H$) and a conjugated base group thereof, an alkoxysulfonyl group, an aryloxysulfonyl group, a sulfinamoyl group, an N-alkylsulfinamoyl group, an N,N-dialkylsulfinamoyl group, an N-arylsulfinamoyl group, an N,N-diarylsulfinamoyl group, an N-alkyl-N-arylsulfinamoyl group, a sulfamoyl group, an N-alkylsulfamoyl group, an N,N-dialkylsulfamoyl group, an N-arylsulfamoyl group, an N,N-diarylsulfamoyl group, an N-alkyl-N-arylsulfamoyl group, an N-acylsulfamoyl group and a conjugated base group thereof, an N-alkylsulfonylsulfamoyl group ($—SO_2NHSO_2$(alkyl)) and a conjugated base group thereof, an N-arylsulfonylsulfamoyl group ($—SO_2NHSO_2$(aryl)) and a conjugated base group thereof, an N-alkylsulfonylcarbamoyl group ($—CONHSO_2$(alkyl)) and a conjugated base group thereof, an N-arylsulfonylcarbamoyl group ($—CONHSO_2$(aryl)) and a conjugated base group thereof, an alkoxysilyl group (—Si(Oalkyl)$_3$), an aryloxysilyl group (—Si(Oaryl)$_3$), a hydroxysilyl group ($—Si(OH)_3$) and a conjugated base group thereof, a phosphono group ($—PO_3H_2$) and a conjugated base group thereof, a dialkylphosphono group ($—PO_3$(alkyl)$_2$), a diarylphosphono group ($—PO_3$(aryl)$_2$), an alkylarylphosphono group ($—PO_3$(alkyl)(aryl)), a monoalkylphosphono group ($—PO_3H$(alkyl)) and a conjugated base group thereof, a monoarylphosphono group ($—PO_3H$(aryl)) and a conjugated base group thereof, a phosphonooxy group ($—OPO_3H_2$) and a conjugated base group thereof, a dialkylphosphonooxy group ($—OPO_3$(alkyl)$_2$), a diarylphosphonooxy group ($—OPO_3$(aryl)$_2$), an alkylarylphosphonooxy group ($—OPO_3$(alkyl)(aryl)), a monoalkylphosphonooxy group ($—OPO_3H$(alkyl)) and a conjugated base group thereof, a monoarylphosphonooxy group ($—OPO_3H$(aryl)) and a conjugated base group thereof, a cyano group, a nitro group, an aryl group, an alkenyl group, an alkynyl group, and an alkyl group. Further, each of the aforementioned groups may further have a substituent (for example, one or more groups of each of the aforementioned groups), if possible. For example, an aryl group that may have a substituent is also included as a group that can be selected from the substituent group Y.

In a case where the group selected from the substituent groups Y has a carbon atom, the number of carbon atoms of the group is, for example, 1 to 20.

The number of atoms other than the hydrogen atom of the group selected from the substituent groups Y is, for example, 1 to 30.

Moreover, these substituents may or may not form a ring by being bonded to each other, if possible, or by being bonded to a group substituted with the substituent. For example, the alkyl group (or an alkyl group moiety in a group including an alkyl group as a partial structure, such as an alkoxy group) may be a cyclic alkyl group (cycloalkyl group) or may be an alkyl group having one or more cyclic structures as a partial structure.

[Boron Nitride Particles]

In the boron nitride particles according to the embodiment of the present invention, an atomic concentration ratio of oxygen atomic concentration to boron atomic concentration on a surface, detected by X-ray photoelectron spectroscopy, is 0.12 or greater, and a D value obtained by Equation (1) described later is 0.010 or less.

Although the mechanism by which the object of the present invention is achieved by such a constitution is not necessarily clear, the present inventors presume as follows.

Although boron nitride has excellent thermally conductive properties, the boron nitride has insufficient adhesion to a resin binder in many cases. Therefore, in a thermally conductive material containing ordinary boron nitride particles and a resin binder, the thermally conductive material itself easily broke (aggregate fracture) due to insufficient adhesion between the resin binder and the boron nitride particles, and it was difficult to achieve the desired peel strength. Such a problem became more remarkable as an average particle diameter of the boron nitride particles became larger.

In order to solve such a problem, for example, it was attempted to improve adhesion between the boron nitride particles and the resin binder by performing surface modification treatment such as heating in an oxidizing atmosphere on the boron nitride particles and introducing oxygen atoms on a surface of the boron nitride particles.

On the other hand, the present inventors found that even if the boron nitride particles subjected to such surface modification treatment are used, the peel strength and/or the thermally conductive properties of the obtained thermally conductive material is deteriorated in many cases. The present inventors presumed that this phenomenon occurs since boron hydroxide is formed on the surface of the boron nitride particles by undergoing the surface modification treatment, and such boron hydroxide adversely affects the strength and thermally conductive properties of the boron nitride particles.

Therefore, in the boron nitride particles according to the embodiment of the present invention, it is defined that, focusing on the boron hydroxide content in the boron nitride particles, a ratio of a peak strength derived from the (002) plane of boron hydroxide having a triclinic space group measured by X-ray diffraction to a peak strength derived from the (002) plane of boron nitride having a hexagonal space group measured by X-ray diffraction should be a predetermined value or less. It is presumed that such a definition achieves excellent thermally conductive properties of the thermally conductive material prepared by using the boron nitride particles according to the embodiment of the present invention.

Furthermore, in addition to the definition, it is defined that in the boron nitride particles according to the embodiment of the present invention, an atomic concentration ratio of oxygen atomic concentration to a boron atomic concentration on the surface, detected by X-ray photoelectron spectroscopy, should be a predetermined value or greater. It is presumed that such a definition achieves excellent peel strength of the thermally conductive material prepared by using the boron nitride particles according to the embodiment of the present invention.

In the present invention, the boron nitride particles may be particles substantially formed of only boron nitride (BN). For example, the content of boron nitride in the boron nitride particles is preferably 90% by mass or greater, more preferably 95% by mass or greater, even more preferably 99% by mass or greater, with respect to the total mass of the boron nitride particles. An upper limit of the content is not particularly limited, but is, for example, less than 100% by mass.

A shape of the boron nitride particles according to the embodiment of the present invention is not particularly limited, and may be any of a scale shape, a flat plate shape, a rice grain shape, a spherical shape, a cubical shape, a spindle shape, and an amorphous shape. In addition, the boron nitride particles may be aggregated particles (secondary particles) formed by aggregation of fine particles having these shapes.

The aggregated particles as a whole may be, for example, spherical or amorphous.

Among them, the boron nitride particles are preferably aggregated particles.

The size of the boron nitride particles according to the embodiment of the present invention (the size as secondary particles in a case where the boron nitride particles are secondary particles) is not particularly limited. Among them, from a viewpoint of more excellent dispersibility of the boron nitride particles, an average particle diameter of the boron nitride particles is preferably 100 μm or less, more preferably 80 μm or less, and even more preferably 60 μm or less. A lower limit is not particularly limited, but from a viewpoint of handleability and/or thermally conductive properties, 500 nm or greater is preferable, 10 μm or greater is more preferable, 20 μm or more is even more preferable, and 40 μm or more is particularly preferable.

The average particle diameter of the boron nitride particles is obtained by randomly selecting 100 pieces of boron nitride using an electron microscope, measuring particle diameters (long diameter) of the respective boron nitride particles, and determining the arithmetic mean thereof.

In addition, in a case where commercially available boron nitride is subjected to a predetermined treatment to obtain the boron nitride particles according to the embodiment of the present invention, in a case where it is recognized that the average particle diameter of the particles does not change significantly before and after the treatment, a catalog value of the average particle diameter of the commercially available boron nitride may be adopted as the average particle diameter of the boron nitride particles.

A specific surface area of the boron nitride particles according to the embodiment of the present invention is preferably 0.1 to 25.0 $m^2/g$, more preferably 1.0 to 10.0 $m^2/g$, and even more preferably 1.3 to 6.0 $m^2/g$.

In the present specification, the specific surface area of the boron nitride particles is the BET specific surface area obtained by the BET method.

An atomic concentration ratio of oxygen atomic concentration to a boron atomic concentration on the surface of boron nitride particles, detected by X-ray photoelectron spectroscopy analysis of boron nitride particles of the present invention, (oxygen atomic concentration (atomic %)/boron atomic concentration (atomic %)) is 0.12 or greater, preferably 0.15 or greater, and more preferably 0.20 or greater. The upper limit of the atomic concentration ratio is not particularly limited, and is, for example, 0.25 or less.

In addition, an atomic concentration ratio of a silicon atomic concentration to the boron atomic concentration on the surface of the boron nitride particles, detected by the X-ray photoelectron spectroscopy analysis of the boron nitride particles according to the embodiment of the present invention, (silicon atomic concentration (atomic %)/boron atomic concentration (atomic %)) is, for example, 0 to 0.001. The silicon atomic concentration on the surface of the boron nitride particles may be less than a detection limit.

The atomic concentration ratio on the surface of the boron nitride particles is measured as follows.

That is, the boron nitride particles are measured by an X-ray photoelectron spectrometer (XPS) produced by ULVAC-PHI: Versa Probe II). As detailed measurement conditions, monochrome Al (tube voltage; 15 kV) is used as the X-ray source, and the analysis area is 300 μm×300 μm. Peak surface area values of oxygen atom, nitrogen atom, boron atom, silicon atom, and carbon atom obtained by the measurement are corrected by the sensitivity coefficient of each element. A ratio of the number of atoms of oxygen atoms, a ratio of the number of atoms of boron atoms, and a ratio of the number of atoms of silicon atoms to the total amount of oxygen atoms, nitrogen atoms, boron atoms, silicon atoms, and carbon atoms, which are corrected, are obtained. The atomic concentration ratio can be calculated based on the obtained ratio of the number of atoms of the oxygen atoms, the ratio of the number of atoms of the boron atoms, and the ratio of the number of atoms of the silicon atoms.

As a method of correcting the peak surface area values of oxygen atom, nitrogen atom, boron atom, silicon atom, and carbon atom obtained by the measurement by the sensitivity coefficient of each element, specifically, for oxygen atom, a peak surface area value of 538 eV from 528 eV is divided by the sensitivity coefficient 0.733 for the oxygen atom, for nitrogen atom, a peak surface area value of 403 eV from 394 eV is divided by the sensitivity coefficient 0.499 for the nitrogen atom, for boron atom, a peak surface area value of 196 eV from 187 eV is divided by the sensitivity coefficient 0.171 for the boron atom, for silicon atom, a peak surface area value of 108 eV from 98 eV is divided by the sensitivity coefficient 0.368 for silicon atom, and for carbon atom, a peak surface area value of 290 eV from 282 eV is divided by the sensitivity coefficient 0.314 for the carbon atom.

In the boron nitride particles according to the embodiment of the present invention, a D value obtained by Equation (1) is 0.010 or less, and preferably 0.005 or less. A lower limit of the D value is not particularly limited, and is, for example, 0 or greater.

$$\text{D value}=B(OH)_3(002)/BN(002) \qquad \text{Equation (1)}$$

$B(OH)_3(002)$: Peak strength derived from a (002) plane of boron hydroxide having a triclinic space group measured by X-ray diffraction.

$BN(002)$: Peak strength derived from the (002) plane of boron nitride having a hexagonal space group measured by X-ray diffraction.

Ordinary powdered boron nitride distributed on the market does not meet ranges of the atomic concentration ratio and/or D value defined as a requirement for the boron nitride particles according to the embodiment of the present invention. In particular, ordinary boron nitride has an atomic concentration ratio of less than a predetermined range in many cases.

In order to obtain the boron nitride particles according to the embodiment of the present invention, for example, there is exemplified a method of introducing oxygen atoms on the surface of the powdered boron nitride while performing appropriate treatment on the powdered boron nitride (in particular, boron nitride having an atomic concentration ratio of less than a predetermined range) distributed on the market such that the D value does not exceed a predetermined range.

The specific method of the treatment is not particularly limited as long as predetermined boron nitride particles can be obtained, and plasma treatment is preferable.

That is, the boron nitride particles according to the embodiment of the present invention are preferably boron nitride particles obtained by subjecting boron nitride (preferably powdered boron nitride) to plasma treatment (preferably oxygen plasma treatment described later).

The boron nitride used as a material for the boron nitride particles according to the embodiment of the present invention preferably meets suitable conditions for the boron nitride particles according to the embodiment of the present invention, except that the atomic concentration ratio and/or D value (in particular, the atomic concentration ratio) do not meet the predetermined requirements.

The plasma treatment may be carried out under atmospheric pressure or under reduced pressure (500 Pa or less, preferably 0 to 100 Pa).

Examples of the gas to be in a plasma state in the plasma treatment include $O_2$ gas, $A_2$ gas, $N_2$ gas, $H_2$ gas, He gas, and a mixed gas containing one or more of these. It is preferable that the gas includes at least $O_2$ gas, it is more preferable that 60% to 100% by volume of the gas is $O_2$ gas, it is even more preferable that 90% to 100% by volume of the gas is $O_2$ gas, and it is particularly preferable that the gas includes substantially only $O_2$ gas.

That is, the plasma treatment is preferably oxygen plasma treatment.

From a viewpoint of controlling the amount of generated boron hydroxide regardless of whether the plasma treatment is performed under atmospheric pressure or reduced pressure, an output in the plasma treatment is preferably 50 to 1,000 W, more preferably 70 to 500 W, and even more preferably 100 to 300 W.

The plasma treatment time in a case of performing the plasma treatment under atmospheric pressure is preferably 0.2 to 30 hours, and more preferably 4 to 8 hours.

The plasma treatment time in a case of performing the plasma treatment under reduced pressure is preferably 0.2 to 10 hours, and more preferably 0.2 to 3 hours.

The plasma treatment may be performed continuously or intermittently. In the case where the plasma treatment is performed intermittently, it is preferable that the total treatment time is within the range.

A treatment temperature at the time of performing plasma treatment is preferably 0° C. to 200° C., and more preferably 15° C. to 100° C.

One kind of the boron nitride particles according to the embodiment of the present invention may be used singly, or two or more kinds thereof may be used in combination.

The boron nitride particles according to the embodiment of the present invention can also be applied to a composition for forming a thermally conductive material, for example.

The boron nitride particles according to the embodiment of the present invention may form surface-modified boron nitride particles containing the boron nitride particles according to the embodiment of the present invention and a surface modifier adsorbed on the surface of the boron nitride particles according to the present invention in collaboration with the surface modifier, or may not form the surface-modified boron nitride particles.

[Composition for Forming a Thermally Conductive Material (Composition)]

The present invention also relates to a composition for forming a thermally conductive material (hereinafter, also simply referred to as "composition").

The composition according to the embodiment of the present invention includes the boron nitride particles according to the embodiment of the present invention and a resin binder or a precursor thereof.

[Boron Nitride Particles]

The boron nitride particles according to the embodiment of the present invention contained in the composition are as described above.

The content of the boron nitride particles according to the embodiment of the present invention is preferably 40% by volume or greater, more preferably 50% by volume or greater, and even more preferably 55% by volume or greater, with respect to the total mass of the solid content of the composition. An upper limit is less than 100% by volume, and preferably 80% by volume or less.

In addition, the total mass of the solid content is intended to mean a component forming a thermally conductive material, and does not contain a solvent. Here, the component for forming a thermally conductive material may be a component of which chemical structure changes by reacting (polymerizing) at a time of forming the thermally conductive material. In addition, in a case where the component is a component for forming a thermally conductive material, even if the property thereof is liquid, the component is regarded as a solid content.

[Resin Binder or Precursor Thereof (Binder Component)]

The composition includes a resin binder or a precursor thereof.

Hereinafter, the resin binder or the precursor thereof is collectively referred to as a binder component.

The binder component may be the resin binder itself or a precursor of the resin binder.

Examples of the composition using the resin binder itself include a composition containing a solvent and a resin binder which is a polymer (resin) dissolved in the solvent. As the solvent of this composition evaporates, the resin binder is precipitated, and a thermally conductive material in which the resin binder functions as a binder (binding agent) is obtained.

In addition, in a case where the composition contains a thermoplastic resin as the resin binder, the composition may be a composition containing a resin binder which is a thermoplastic resin and not containing a solvent, for example. By cooling and solidifying this composition in a desired form while heating and melting, a thermally conductive material in which the resin binder which is the thermoplastic resin functions as a binder (binding agent) may be obtained.

The precursor of the resin binder is, for example, a component that polymerizes and/or crosslinks under predetermined conditions to become a resin binder (polymer and/or crosslinked body) in a process of forming a thermally conductive material from the composition. The resin binder thus formed functions as a binder (binding agent) in the thermally conductive material.

Examples of the precursor of the resin binder include a curable compound.

Examples of the curable compound include a compound in which polymerization and/or crosslinking proceeds by heat or light (ultraviolet light or the like) for curing. That is, a thermosetting compound and a photocurable compound are exemplified. These compounds may be polymers or monomers. The curable compound may be a mixture of two or more compounds (for example, a main agent and a curing agent). The precursor of the resin binder may chemically react with a surface modifier described later.

Examples of the resin binder (including a resin binder formed from the precursor of the resin binder) include an epoxy resin, a silicone resin, a phenol resin, a polyimide resin, a polyester resin, a bismaleimide resin, a melamine resin, a phenoxy resin, an isocyanate-based resin (polyurethane resin, polyurea resin, polyurethane urea resin, and the like), and a resin formed by chain polymerization of two or more monomers having a polymerizable double bond, such as a radical polymer ((meth)acrylic resin and the like).

In addition, the resin binder (including the resin binder formed from the precursor of the resin binder) may be a resin formed by reacting the following (functional group 1/functional group 2) one or more combinations between different monomers, for example.

(Functional group 1/functional group 2)=(polymerizable double bond/polymerizable double bond), (polymerizable double bond/thiol group), (carboxylic acid halide group (carboxylic acid chloride group and the like)/primary or secondary amino group), (carboxyl group/primary or secondary amino group) (carboxylic acid anhydride group/primary or secondary amino group), (carboxyl group/aziridine group), (carboxyl group/isocyanate group), (carboxyl group/epoxy group), (carboxyl group/benzyl halide group), (primary or secondary amino group/isocyanate group), (primary, secondary, or tertiary amino group/benzyl halide group), (primary amino group/aldehydes), (isocyanate group/isocyanate group), (isocyanate group/hydroxyl group), (isocyanate group/epoxy group), (hydroxyl group/benzyl halide group), (hydroxyl group/carboxylic acid anhydride group), (hydroxyl group/alkoxysilyl group), (epoxy group/primary or secondary amino group), (epoxy group/carboxylic acid anhydride group), (epoxy group/hydroxyl group), (epoxy group/epoxy group), (oxetanyl group/epoxy group), (alkoxysilyl group/alkoxysilyl group), and the like.

The polymerizable double bond is intended to be a double bond between carbons capable of polymerization such as radical polymerization, and examples thereof include a (meth)acryloyl group and a double bond between carbons in a vinyl group.

Among them, the composition preferably contains a precursor of a resin binder as a binder component, and more preferably contains a precursor of a resin binder capable of forming an epoxy resin.

One kind of the resin binders may be used singly, or two or more kinds thereof may be used in combination.

<Epoxy Resin>

The resin binder (in particular, resin binder formed from the precursor of the resin binder) is preferably an epoxy resin.

That is, the composition preferably contains a binder component (that is, an epoxy compound and the like) capable of forming an epoxy resin.

The epoxy resin can be formed by using the epoxy compound singly or by polymerizing the epoxy compound with another compound (active hydrogen group-containing compound such as phenolic compound and amine compound, and/or acid anhydride).

Among them, the epoxy resin is preferably formed by reacting an epoxy compound with another compound (preferably a phenolic compound).

(Epoxy Compound)

The epoxy compound is a compound having at least one epoxy group (oxiranyl group) in one molecule.

The epoxy group is a group formed by removing one or more hydrogen atoms (preferably one hydrogen atom) from an oxirane ring. If possible, the epoxy group may further have a substituent (a linear or branched alkyl group having 1 to 5 carbon atoms).

The number of epoxy groups contained in the epoxy compound is preferably 2 or greater, more preferably 2 to 40, even more preferably 2 to 10, and particularly preferably 2, in one molecule.

A molecular weight of the epoxy compound is preferably 150 to 10,000, more preferably 150 to 1,000, and even more preferably 200 to 290.

An epoxy group content of the epoxy compound is preferably 2.0 to 20.0 mmol/g, more preferably 5.0 to 15.0 mmol/g, and even more preferably 6.0 to 14.0 mmol/g.

The epoxy group content means the number of epoxy groups contained in 1 g of the epoxy compound.

The epoxy compound also preferably has an aromatic ring group (preferably an aromatic hydrocarbon ring group).

The epoxy compound may or may not exhibit liquid crystallinity.

That is, the epoxy compound may be a liquid crystal compound. In other words, the epoxy compound may be a liquid crystal compound having an epoxy group.

Among them, the epoxy compound is preferably a polyhydroxy aromatic ring type glycidyl ether (polyhydroxy aromatic ring type epoxy compound).

The polyhydroxy aromatic ring type glycidyl ether is a compound of a structure formed by glycidyl etherification of two or more hydroxyl groups in an aromatic ring having the two or more (preferably 2 to 6, more preferably 2 to 3, and even more preferably 2) hydroxyl groups as a substituent.

The aromatic ring may be an aromatic hydrocarbon ring or an aromatic hetero ring, and an aromatic hydrocarbon ring is preferable. The aromatic ring may be polycyclic or monocyclic ring. The number of ring members of the aromatic ring is preferably 5 to 15, more preferably 6 to 12, and even more preferably 6.

The aromatic ring may or may not have a substituent other than a hydroxyl group.

Examples of the polyhydroxy aromatic ring type glycidyl ether include 1,3-phenylene bis(glycidyl ether).

In addition, examples of the epoxy compound include a compound (rod-like compound) containing a rod-like structure in at least a portion thereof and a compound (disk-like compound) containing a disk-like structure in at least a portion thereof.

Hereinafter, the rod-like compound and the disk-like compound will be described in detail.

Rod-Like Compound

Examples of the epoxy compounds, which are rod-like compounds, include azomethines, azoxies, cyanobiphenyls, cyanophenyl esters, benzoic acid esters, cyclohexane carboxylic acid phenyl esters, cyanophenyl cyclohexanes, cyano-substituted phenylpyrimidines, alkoxy-substituted phenylpyrimidines, phenyldioxanes, tolans, and alkenylcyclohexyl benzonitriles. In addition to these low-molecular-weight compounds described above, high-molecular-weight compounds can also be used. The high-molecular-weight compounds are high-molecular-weight compounds obtained by polymerizing rod-like compounds having a low-molecular-weight reactive group.

Examples of a preferred rod-like compound include a rod-like compound represented by General Formula (XXI).

$$Q^1\text{-}L^{111}\text{-}A^{111}\text{-}L^{113}\text{-}M\text{-}L^{114}\text{-}A^{112}\text{-}L^{112}\text{-}Q^2 \qquad \text{General Formula (XXI)}$$

In General Formula (XXI), $Q^1$ and $Q^2$ are each independently an epoxy group, and $L^{111}$, $L^{112}$, $L^{113}$, and $L^{114}$ each independently represent a single bond or a divalent linking group. $A^{111}$ and $A^{112}$ each independently represent a divalent linking group (spacer group) having 1 to 20 carbon atoms. M represents a mesogenic group.

The epoxy group of $Q^1$ and $Q^2$ may or may not have a substituent.

In General Formula (XXI), $L^{111}$, $L^{112}$, $L^{113}$, and $L^{114}$ each independently represent a single bond or a divalent linking group.

The divalent linking groups represented by $L^{111}$, $L^{112}$, $L^{113}$, and $L^{114}$ are preferably each independently a divalent linking group selected from the group consisting of —O—, —S—, —CO—, —$NR^{112}$—, —CO—O—, —O—CO—O—, —CO—$NR^{112}$—, —$NR^{112}$—CO—, —O—CO—, —$CH_2$—O—, —O—$CH_2$, —O—CO—$NR^{112}$—, —$NR^{112}$—CO—O—, and —$NR^{112}$—CO—$NR^{112}$—. $R^{112}$ is an alkyl group or a hydrogen atom having 1 to 7 carbon atoms.

Among them, $L^{113}$ and $L^{114}$ are each independently preferably —O—.

$L^{111}$ and $L^{112}$ are each independently preferably a single bond.

In General Formula (XXI), $A^{111}$ and $A^{112}$ each independently represent a divalent linking group having 1 to 20 carbon atoms.

The divalent linking group may contain heteroatoms such as non-adjacent oxygen atoms and sulfur atoms. Among them, an alkylene group, an alkenylene group, or an alkynylene group, having 1 to 12 carbon atoms, are preferable. The alkylene group, alkenylene group, or alkynylene group may or may not have an ester group.

The divalent linking group is preferably linear, and the divalent linking group may or may not have a substituent. Examples of the substituent include a halogen atom (fluorine atom, chlorine atom, and bromine atom), a cyano group, a methyl group, and an ethyl group.

Among them, $A^{111}$ and $A^{112}$ are each independently preferably an alkylene group having 1 to 12 carbon atoms, and more preferably a methylene group.

In General Formula (XXI), M represents a mesogenic group, and examples of the mesogenic group include known mesogenic groups. Among them, a group represented by General Formula (XXII) is preferable.

$$—(W^1\text{-}L^{115})_n\text{-}W^2— \qquad \text{General Formula (XXII)}$$

In General Formula (XXII), $W^1$ and $W^2$ each independently represent a divalent cyclic alkylene group, a divalent cyclic alkenylene group, an arylene group, or a divalent heterocyclic group. $L^{115}$ represents a single bond or a divalent linking group. n represents an integer of 1 to 4.

Examples of $W^1$ and $W^2$ include 1,4-cyclohexanediyl, 1,4-cyclohexenediyl, 1,4-phenylene, pyrimidine-2,5-diyl, pyridine-2,5-diyl, 1,3,4-thiadiazole-2,5-diyl, 1,3,4-oxadiazole-2,5-diyl, naphthalene-2,6-diyl, naphthalene-1,5-diyl, thiophene-2,5-diyl, and pyridaxine-3,6-diyl. In a case of the 1,4-cyclohcxancdiyl group, the group may be any one isomer of structural isomers of a trans-isomer and a cis-isomer, or a mixture in which the isomers are mixed at any ratio. Among them, the trans-isomer is preferable.

$W^1$ and $W^2$ may each have a substituent. Examples of the substituent include groups exemplified in the aforementioned substituent group Y, and more specific examples thereof include a halogen atom (fluorine atom, chlorine atom, bromine atom, and iodine atom), a cyano group, an alkyl group having 1 to 10 carbon atoms (for example, methyl group, ethyl group, propyl group, and the like), an alkoxy group having 1 to 10 carbon atoms (for example, methoxy group, ethoxy group, and the like), an acyl group having 1 to 10 carbon atoms (for example, formyl group, acetyl group, and the like), an alkoxycarbonyl group having 1 to 10 carbon atoms (for example, methoxycarbonyl group, ethoxycarbonyl group, and the like), an acyloxy group having 1 to 10 carbon atoms (for example, acetyloxy group, propionyloxy group, and the like), a nitro group, a trifluoromethyl group, and a difluoromethyl group.

In a case where there are a plurality of $W^1$'s, the plurality of $W^1$'s may be the same as or different from each other.

In General Formula (XXII), $L^{115}$ represents a single bond or a divalent linking group. As the divalent linking group represented by $L^{115}$, a specific example of the aforementioned divalent linking group represented by $L^{111}$ to $L^{114}$ is exemplified, and examples thereof include —CO—O—, —O—CO—, —$CH_2$—O—, and —O—$CH_2$—.

In a case where there are a plurality of $L^{115}$'s, the plurality of $L^{115}$'s may be the same as or different from each other.

Preferable skeletons in a basic skeleton of the mesogenic group represented by General Formula (XXII) are exemplified below. The mesogenic group may be substituted with substituents on these skeletons.

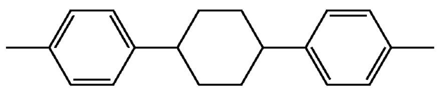
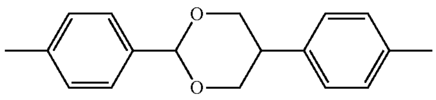
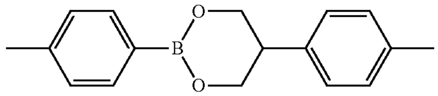
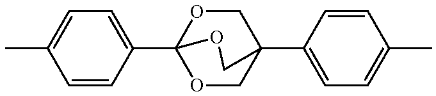
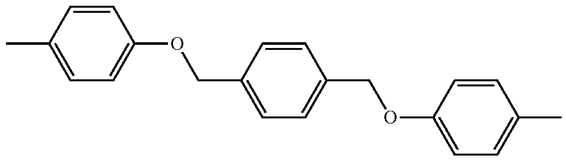
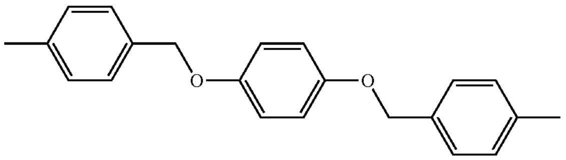
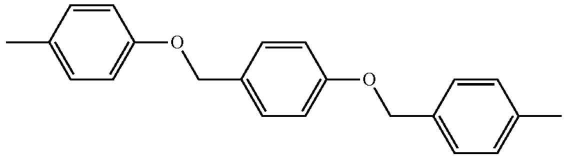
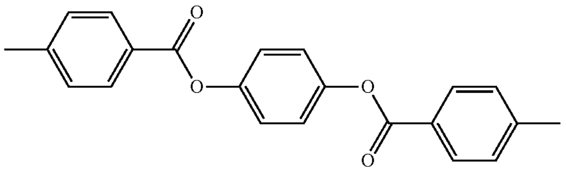
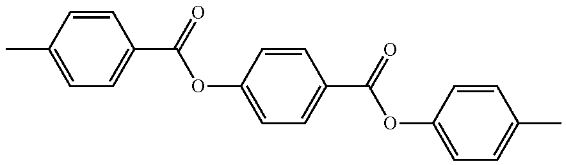
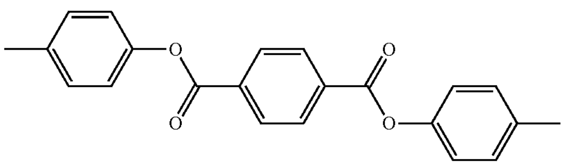
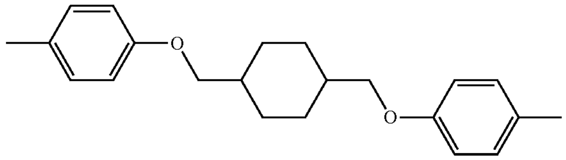
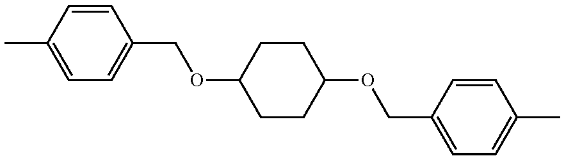
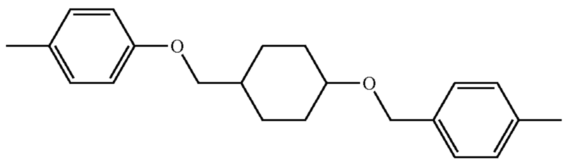
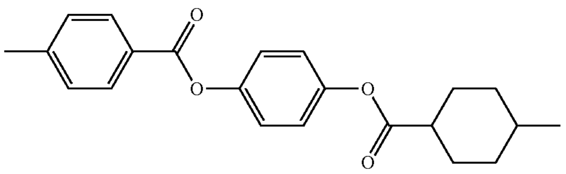

-continued

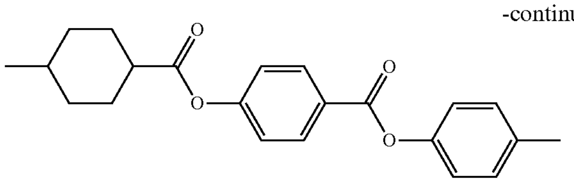

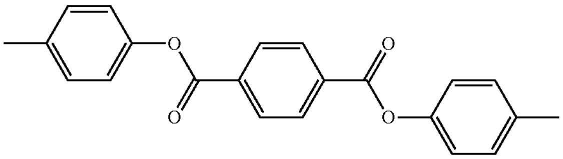

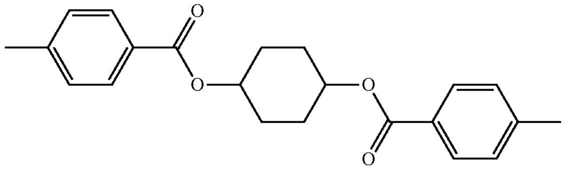

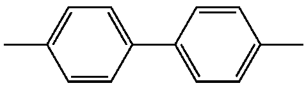

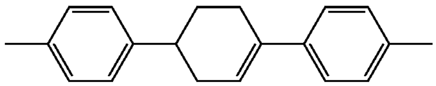

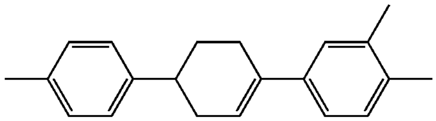

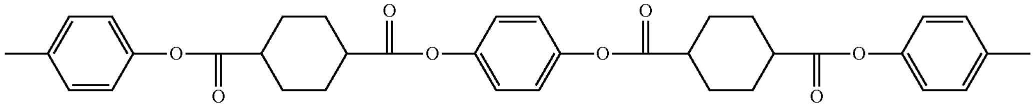

Among the skeletons, a biphenyl skeleton is preferable from a viewpoint of more excellent thermally conductive properties of the obtained thermally conductive material.

The compound represented by General Formula (XXI) can be synthesized by referring to the method disclosed in JP1999-513019A (JP-H11-513019A) (WO97/00600).

The rod-like compound may be a monomer having a mesogenic group disclosed in JP1999-323162A (JP-H11-323162A) and JP4118691B.

Among them, the rod-like compound is preferably a compound represented by General Formula (E1).

(E1)

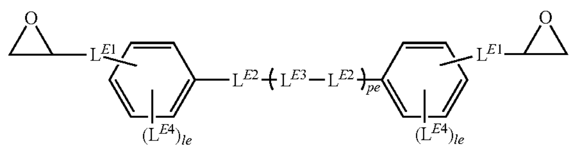

In General Formula (E1), $L^{E1}$'s each independently represent a single bond or a divalent linking group.

Among them, $L^{E1}$ is preferably a divalent linking group.

The divalent linking group is preferably —O—, —S—, —CO—, —NH—, —CH═CH—, —C≡C—, —CH═N—, —N═CH—, —N═N—, an alkylene group which may have a substituent, or a group obtained by combining two or more thereof, and more preferably —O-alkylene group- or -alkylene group-O—.

Moreover, the alkylene group may be any one of linear, branched, or cyclic, but is preferably a linear alkylene group having 1 or 2 carbon atoms.

The plurality of $L^{E1}$'s may be the same as or different from each other.

In General Formula (E1), $L^{E2}$'s each independently represent a single bond, —CH═CH—, —CO—O—, —O—CO—, —C(—$CH_3$)═CH—, —CH═C(—$CH_3$)—, —CH═N—, —N═CH—, —N═N—, —C≡C—, —N═$N^+$(—$O^-$)—, —$N^+$(—$O^-$)═N—, —CH═$N^+$(—$O^-$)═CH—, —CH═CH—CO—, —CO—CH═C—, —CH═C(—CN)—, or —C(—CN)═CH—.

Among them, $L^{E2}$'s are each independently preferably a single bond, —CO—O—, or —O—CO—.

In a case where there are a plurality of $L^{E2}$'s, the plurality of $L^{E2}$'s may be the same as or different from each other.

In General Formula (E1), $L^{E3}$'s each independently represent a single bond, a 5-membered or 6-membered aromatic ring group or a 5-membered or 6-membered non-aromatic ring group, which may have a substituent, or a polycyclic group consisting of these rings.

Examples of the aromatic ring group and non-aromatic ring group represented by $L^{E3}$ include a 1,4-cyclohexanediyl group, a 1,4-cyclohexenediyl group, a 1,4-phenylene group, a pyrimidine-2,5-diyl group, a pyridine-2,5-diyl group, a 1,3,4-thiadiazole-2,5-diyl group, a 1,3,4-oxadiazole-2,5-diyl group, a naphthalene-2,6-diyl group, a naphthalene-1,5-diyl group, a thiophene-2,5-diyl group, and a pyridazine-3,6-diyl group, each of which may have a substituent. In a case of the 1,4-cyclohexanediyl group, the group may be any one isomer of structural isomers of a trans-isomer and a cis-isomer, or a mixture in which the isomers are mixed at any ratio. Among them, a trans-isomer is preferable.

Among them, $L^{E3}$ is preferably a single bond, a 1,4-phenylene group, or a 1,4-cyclohexenediyl group.

The substituents contained in the groups represented by $L^{E3}$ are each independently preferably an alkyl group, an alkoxy group, a halogen atom, a cyano group, a nitro group, or an acetyl group, and more preferably an alkyl group (preferably having one carbon atom).

In a case where there are a plurality of substituents, these substituents may be the same as or different from each other.

In a case where there are a plurality of $L^{E3}$'s, the plurality of $L^{E3}$'s may be the same as or different from each other.

In General Formula (E1), pe represents an integer of 0 or greater.

In a case where pe is an integer of 2 or greater, a plurality of (-$L^{E3}$-$L^{E2}$-)'s may be the same as or different from each other.

Among them, pe is preferably 0 to 2, more preferably 0 or 1, and even more preferably 0.

In General Formula (E1), $L^{E4}$'s each independently represent a substituent.

The substituents are each independently preferably an alkyl group, an alkoxy group, a halogen atom, a cyano group, a nitro group, or an acetyl group, and more preferably an alkyl group (preferably having one carbon atom).

A plurality of $L^{E4}$'s may be the same as or different from each other. In addition, in a case where le described below is an integer of 2 or greater, the plurality of $L^{E4}$'s present in the same $(L^{E4})_{le}$ may also be the same as or different from each other.

In General Formula (E1), le's each independently represent an integer of 0 to 4.

Among them, le's are each independently preferably 0 to 2.

A plurality of le's may be the same as or different from each other.

The rod-like compound preferably has a biphenyl skeleton from a viewpoint of more excellent thermally conductive properties of the obtained thermally conductive material.

In other words, the epoxy compound preferably has a biphenyl skeleton, and the epoxy compound in this case is more preferably a rod-like compound.

Disk-Like Compound

The epoxy compound, which is a disk-like compound, has a disk-like structure in at least a portion thereof.

The disk-like structure has at least an alicyclic ring or an aromatic ring. In particular, in a case where the disk-like structure has an aromatic ring, the disk-like compound can form a columnar structure by forming a stacking structure based on an intermolecular π-π interaction.

Examples of the disk-like structure include the triphenylene structure described in Angew. Chem. Int. Ed. 2012, 51, 7990 to 7993, or JP1995-306317A (JP-117-306317A), and the trisubstituted benzene structures described in JP2007-2220A and JP2010-244038A.

In a case where a disk-like compound is used as the epoxy compound, a thermally conductive material exhibiting high thermally conductive properties can be obtained. The reason is that since the rod-like compound can conduct heat only linearly (one-dimensionally), whereas the disk-like compound can conduct heat planarly (two-dimensionally) in a normal direction, it is considered that the thermal conduction path increases and the thermal conductivity improves.

The disk-like compound preferably has three or more epoxy groups. The cured product of the composition including the disk-like compound having three or more epoxy groups tends to have a high glass transition temperature and high heat resistance.

The number of epoxy groups contained in the disk-like compound is preferably 8 or less and more preferably 6 or less.

Specific examples of the disk-like compound include compounds which have at least one (preferably, three or more) of terminals as an epoxy group in the compounds or the like described in C. Destrade et al., Mol. Crysr. Liq. Cryst., vol. 71, page 111 (1981); edited by The Chemical Society of Japan, Quarterly Review of Chemistry, No. 22, Chemistry of Liquid Crystal, Chapter 5, Chapter 10, Section 2 (1994); B. Kohne et al., Angew. Chem. Soc. Chem. Comm., page 1794 (1985); J. Zhang et al., J. Am. Chem. Soc., vol. 116, page 2655 (1994); and JP4592225B. Examples of the disk-like compound include compounds which have at least one (preferably, three or more) of terminals as an epoxy group in the triphenylene structure described in Angew. Chem. Int. Ed. 2012, 51, 7990 to 7993 and JP1995-306317A (JP-H07-306317A) and the trisubstituted benzene structures described in JP2007-2220A and JP2010-244038A.

Other Epoxy Compounds

Examples of other epoxy compounds other than the aforementioned epoxy compound include an epoxy compound represented by General Formula (DN).

(DN)

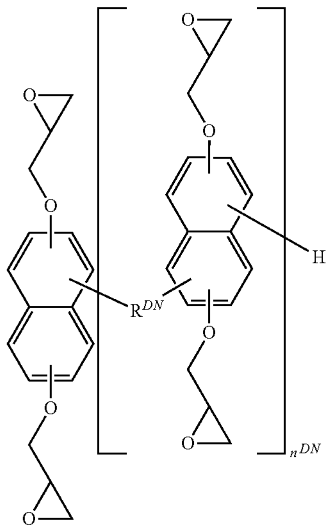

In General Formula (UN), $n^{DN}$ represents an integer of 0 or greater, and is preferably 0 to 5 and more preferably 1.

$R^{DN}$ represents a single bond or a divalent linking group. The divalent linking group is preferably —O—, —O—CO—, —CO—O—, —S—, an alkylene group (the number of carbon atoms is preferably 1 to 10), an arylene group (the number of carbon atoms is preferably 6 to 20), or a group obtained by combining these groups, more preferably an alkylene group, and even more preferably a methylene group.

Examples of other epoxy compounds include compounds in which the epoxy group is fused. Examples of such a compound include 3,4: 8,9-diepoxybicyclo [4.3.0] nonane.

Examples of the other epoxy compounds include, in addition to the aforementioned epoxy compounds, a bisphenol A-type epoxy compound, a bisphenol F-type epoxy compound, a bisphenol S-type epoxy compound, a bisphenol AD-type epoxy compound, and the like, which are glycidyl ethers of bisphenol A, F, S, and AD, and the like; a hydrogenated bisphenol A-type epoxy compound, a hydrogenated bisphenol AD-type epoxy compound, and the like; a phenol novolac-type glycidyl ether (phenol novolac-type epoxy compound), a cresol novolac-type glycidyl ether (cresol novolac-type epoxy compound), a bisphenol A novolac-type glycidyl ether, and the like; a dicyclopentadiene-type glycidyl ether (dicyclopentadiene-type epoxy compound); a dihydroxypentadiene-type glycidyl ether (dihydroxypentadiene-type epoxy compound); a benzene polycarboxylic acid-type glycidyl ester (benzene polycarboxylic acid-type epoxy compound); and a trisphenol methane-type epoxy compound.

One kind of the epoxy compounds may be used singly, or two or more kinds thereof may be used.

(Active Hydrogen Group-Containing Compound)

The epoxy resin is preferably formed by reacting an epoxy compound with an active hydrogen group-containing compound.

The active hydrogen group-containing compound is a compound having one or more (preferably two or more, more preferably 2 to 10) groups having active hydrogen (active hydrogen group).

Examples of the active hydrogen group include a hydroxyl group, a primary or secondary amino group, a mercapto group, and the like, and among them, a hydroxyl group is preferable.

The active hydrogen group-containing compound is preferably a polyol having 2 or more (preferably 3 or more, more preferably 3 to 6) hydroxyl groups.

Among them, the active hydrogen group-containing compound used in combination with the epoxy compound is preferably a phenolic compound.

That is, the composition according to the embodiment of the present invention preferably contains an epoxy compound and a phenolic compound as the resin binder or a precursor thereof.

The phenolic compound is a compound having one or more (preferably two or more, more preferably three or more, and even more preferably 3 to 6) phenolic hydroxyl groups.

From a viewpoint of more excellent effect of the present invention, examples of the phenolic compound include a compound represented by General Formula (P1).

Compound represented by General Formula (P1)

General Formula (P1) will be shown below.

(P1)

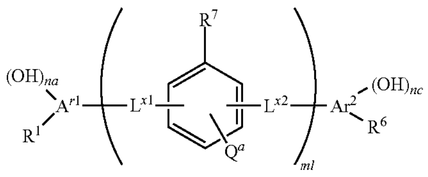

In General Formula (P1), m1 represents an integer of0 or greater.

m1 is preferably 0 to 10, more preferably 0 to 3, even more preferably 0 or 1, and particularly preferably 1.

In General Formula (P1), na and nc each independently represent an integer of 1 or greater.

na and nc are each independently preferably 1 to 4.

In General Formula (P1), $R^1$ and $R^6$ each independently represent a hydrogen atom, a halogen atom, a carboxylic acid group, a boronic acid group, an aldehyde group, an alkyl group, an alkoxy group, or an alkoxycarbonyl group.

The alkyl group may be linear or branched. The number of carbon atoms in the alkyl group is preferably 1 to 10. The alkyl group mayor may not have a substituent.

An alkyl group moiety in the alkoxy group and an alkyl group moiety in the alkoxycarbonyl group are the same as the alkyl group.

$R^1$ and $R^6$ are each independently preferably a hydrogen atom or a halogen atom, more preferably a hydrogen atom or a chlorine atom, and even more preferably a hydrogen atom.

In General Formula (P1), $R^7$ represents a hydrogen atom or a hydroxyl group.

In a case where there are a plurality of $R^7$'s, the plurality of $R^7$'s may be the same as or different from each other.

In a case where there are the plurality of $R^7$'s, it is also preferable that at least one $R^7$ among the plurality of $R^7$'s represents a hydroxyl group.

In General Formula (P1), $L^{x1}$ represents a single bond. —C($R^2$)($R^3$)—, or —CO—, and is preferably —C($R^2$)($R^3$)— or —CO—.

$L^{x2}$ represents a single bond, —C($R^4$)($R^5$)—, or —CO—, and is preferably —C($R^4$)($R^5$)— or —CO—.

$R^2$ to $R^5$ each independently represent a hydrogen atom or a substituent.

The substituents are each independently preferably a hydroxyl group, a phenyl group, a halogen atom, a carboxylic acid group, a boronic acid group, an aldehyde group, an alkyl group, an alkoxy group, or an alkoxycarbonyl group, and more preferably a hydroxyl group, a halogen atom, a carboxylic acid group, a boronic acid group, an aldehyde group, an alkyl group, an alkoxy group, or an alkoxycarbonyl group.

The alkyl group may be linear or branched. The number of carbon atoms in the alkyl group is preferably 1 to 10. The alkyl group may or may not have a substituent.

An alkyl group moiety in the alkoxy group and an alkyl group moiety in the alkoxycarbonyl group are the same as the alkyl group.

The phenyl group may or may not have a substituent, and in a case where the phenyl group has a substituent, it is more preferable to have one to three hydroxyl groups.

$R^2$ to $R^5$ are each independently preferably a hydrogen atom or a hydroxyl group and more preferably a hydrogen atom.

$L^{x1}$ and $L^{x2}$ are each independently preferably —$CH_2$—, —CH(OH)—, —CO—, or —CH(Ph)-.

Ph represents a phenyl group which may have a substituent.

Furthermore, in General Formula (P1), in a case where there are a plurality of $R^4$'s, the plurality of $R^4$'s may be the same as or different from each other. In a case where there are a plurality of $R^5$'s, the plurality of $R^5$'s may be the same as or different from each other.

In General Formula (P1), $Ar^1$ and $Ar^2$ each independently represent a benzene ring group or a naphthalene ring group.

$Ar^1$ and $Ar^2$ are each independently preferably a benzene ring group.

In General Formula (P1), $Q^a$ represents a hydrogen atom, an alkyl group, a phenyl group, a halogen atom, a carboxylic acid group, a boronic acid group, an aldehyde group, an alkoxy group, or an alkoxycarbonyl group.

The alkyl group may be linear or branched. The number of carbon atoms in the alkyl group is preferably 1 to 10. The alkyl group mayor may not have a substituent.

An alkyl group moiety in the alkoxy group and an alkyl group moiety in the alkoxycarbonyl group are the same as the alkyl group.

The phenyl group may or may not have a substituent.

$Q^a$ is preferably bonded to a para position with respect to a hydroxyl group that a benzene ring group, to which $Q^a$ is bonded, may have.

$Q^a$ is preferably a hydrogen atom or an alkyl group. The alkyl group is preferably a methyl group.

Furthermore, in General Formula (P1), in a case where there are a plurality of $R^7$'s, $L^{x2}$'s, and/or $Q^a$'s, the plurality of $R^7$'s, $L^{x2}$'s, and/or $Q^a$'s may be the same as or different from each other.

Compound Represented by General Formula (P2)

Examples of the phenolic compound include a compound represented by General Formula (P2).

(P2)

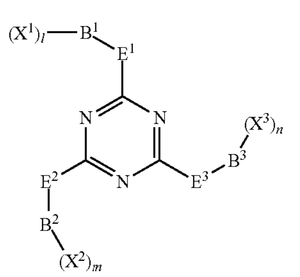

In General Formula (P2), $E^1$ to $E^3$ each independently represent a single bond, —NH—, or —NR—. R represents a substituent (preferably, a linear or branched alkyl group having 1 to 5 carbon atoms).

In General Formula (P2), $B^1$ to $B^3$ each independently have an aromatic ring group having 6 or more (preferably 6 to 10) carbon atoms which are ring member atoms and may have a substituent.

The aromatic ring group may be an aromatic hydrocarbon ring group, or may be an aromatic heterocyclic group.

The aromatic ring group may be monocyclic or polycyclic.

l, m, and n each independently represent an integer of 0 or more (preferably 0 to 5).

In a case where l is 2 or more, the l $X^1$'s may be the same or different.

In a case where m is 2 or more, m $X^2$'s may be the same or different.

In a case where n is 2 or more, n $X^3$'s may be the same or different.

In addition, the total of l, m, and n is preferably 2 or more (preferably 2 to 6).

$X^1$ to $X^3$ each independently represent a group represented by General Formula (Q2).

(Q2)

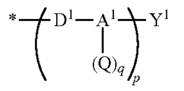

In General Formula (Q2), * represents a bonding position.

$D^1$ represents a single bond or a divalent linking group.

Examples of the divalent linking group include —O—, —S—, —CO—, —$NR^N$—, —$SO_2$—, an alkylene group, or a group obtained by combining these groups, $R^N$ in —$NR^N$— represents a hydrogen atom or a substituent (a linear or branched alkyl group having 1 to 5 carbon atoms, and the like). The alkylene group is preferably a linear or branched alkylene group having 1 to 8 carbon atoms.

$A^1$ represents an aromatic ring group which may have a substituent and has 2 or more (preferably 6 to 10) carbon atoms which are ring member atoms, or a cycloalkane ring group which may have a substituent and has 3 or more (preferably 6 to 10) carbon atoms which are ring member atoms.

The aromatic ring group may be an aromatic hydrocarbon ring group, or may be an aromatic heterocyclic group.

The aromatic ring group and the cycloalkane ring group may be monocyclic or polycyclic.

Q and $Y^1$ each independently represent a specific functional group selected from the group consisting of a monovalent group having an aldehyde group, a boronic acid group, a hydroxyl group and an epoxy group, a monovalent group having an amino group, a thiol group, a carboxylic acid group, and a carboxylic acid anhydride group, and a monovalent group having an isocyanate group and an oxetanyl group. However, at least one (preferably 2 to 6) of the total sum of Q and $Y^1$ present in General Formula (P2) is a hydroxyl group that is directly bonded to an aromatic ring group ($B^1$ to $B^3$, or $A^1$ which is an aromatic ring group).

p represents an integer of 0 or more (preferably 0 to 2).

q represents an integer of 0 to 2.

In General Formula (P2), in a case where there are a plurality of groups represented by the same reference numeral, the plurality of groups represented by the same reference numeral may be the same or different.

However, in a case where i is 1 or more and at least one $X^1$ is a hydroxyl group, the atom in $B^1$, which is directly bonded to $X^1$ which is the hydroxyl group, and the atom in $B^1$, which is directly bonded to $E^1$ are preferably not adjacent to each other. In a case where m is 1 or more and at least one $X^2$ is a hydroxyl group, the atom in $B^2$, which is directly bonded to $X^2$ which is the hydroxyl group, and the atom in $B^2$, which is directly bonded to $E^2$ are preferably not adjacent to each other. In a case where n is 1 or more and at least one $X^3$ is a hydroxyl group, the atom in $B^3$, which directly bonded to $X^3$ which is the hydroxyl group, and the atom in $B^3$, which is directly bonded to $E^3$ are preferably not adjacent to each other.

In addition to the phenolic compounds, as the phenolic compound, for example, a benzene polyol such as benzenetriol, a biphenyl aralkyl-type phenolic resin, a phenol novolac resin, a cresol novolac resin, an aromatic hydrocarbon formaldehyde resin-modified phenolic resin, a dicyclopentadiene phenol addition-type resin, a phenol aralkyl resin, a polyhydric phenol novolac resin synthesized from a polyhydric hydroxy compound and formaldehyde, a naphthol aralkyl resin, a trimethyloimethane resin, a tetraphenylolethane resin, a naphthol novolac resin, a naphthol phenol co-condensed novolac resin, a naphthol cresol co-condensed novolac resin, a biphenyl-modified phenolic resin, a biphenyl-modified naphthol resin, an aminotriazine-modified phenolic resin, an alkoxy group-containing aromatic ring-modified novolac resin, or the like is also preferable.

A lower limit value of the hydroxyl group content of the phenolic compound is preferably 3.0 mmol/g or greater and more preferably 7.0 mmol/g or greater. An upper limit value thereof is preferably 25.0 mmol/g or less and more preferably 20.0 mmol/g or less.

Moreover, the hydroxyl group content means the number of hydroxyl groups (preferably, phenolic hydroxyl groups) contained in 1 g of the phenolic compound.

Furthermore, the phenolic compound may have an active hydrogen-containing group (carboxylic acid group or the like) capable of a polymerization reaction with an epoxy compound, in addition to the hydroxyl group. The lower limit value of the content (total content of hydrogen atoms in a hydroxyl group, a carboxylic acid group, and the like) of an active hydrogen in the phenolic compound is preferably 3.0 mmol/g or greater and more preferably 7.0 mmol/g or greater. An upper limit value thereof is preferably 25.0 mmol/g or less and more preferably 20.0 mmol/g or less.

Moreover, the content of the active hydrogen means the number of active hydrogen atoms contained in 1 g of the phenolic compound.

The upper limit value of the molecular weight of the phenolic compound is preferably 600 or less, more preferably 500 or less, even more preferably 450 or less, and particularly preferably 400 or less. The lower limit value thereof is preferably 110 or greater and more preferably 300 or greater.

One kind of the phenolic compounds may be used singly, or two or more kinds thereof may be used.

In a case where the composition contains the epoxy compound and the active hydrogen group-containing compound, for a ratio of the content of the epoxy compound to the content of the active hydrogen group-containing compound, an equivalent ratio ("number of epoxy group"/"number of active hydrogen group") of the epoxy group of the epoxy compound to the active hydrogen group (preferably hydroxyl group, and more preferably phenolic hydroxyl group) of the active hydrogen group-containing compound is preferably an amount of 30/70 to 70/30, more preferably an amount of 40/60 to 60/40, and even more preferably 45/55 to 55/45.

In a case where the composition contains an epoxy compound and/or an active hydrogen group-containing compound, the total content of the epoxy compound and the active hydrogen group-containing compound is preferably 20% to 100% by volume, more preferably 60% to 100% by volume, and even more preferably 90% to 100% by volume, with respect to the total binder component.

In the composition according to the embodiment of the present invention, the viscosity (also referred to as "viscosity X") of the binder component (for example, a mixture thereof in a case where the binder component includes an epoxy compound and a phenolic compound) at 120° C. is preferably 10 Pa·s or less, and more preferably 1 Pa·s or less. A lower limit of the viscosity X is, for example, 0.001 Pa·s or greater.

In addition, in a case where the epoxy compound and the phenolic compound are contained as the binder component, a composition T obtained by blending the phenolic compound and the epoxy compound such that the equivalent ratio of the hydroxyl group contained in the phenolic compound to the epoxy group contained in the epoxy compound preferably meets the viscosity range.

In a case where the binder component contains two or more kinds of phenolic compounds, the composition T also contains two or more kinds of phenolic compounds. In this case, the composition ratio of the two or more phenolic compounds contained in the composition T is the same as the composition ratio of the two or more phenolic compounds in the binder component. The same applies in a case where the binder component contains two or more kinds of epoxy compounds.

The viscosity X and the viscosity of the composition T are measured in a range of 100° C. to 180° C. using RheoStress RS6000 (manufactured by EKO INSTRUMENTS CO., LTD), and the value obtained by reading the viscosity at 120° C. is adopted. A temperature rising rate is measured as 3° C./min, and a shear rate is measured as 10 (1/s).

A content of the binder component in the composition is preferably 5% to 90% by volume, more preferably 10% to 50% by volume, and even more preferably 20% to 45% by volume, with respect to the total mass of the solid content of the composition.

[Curing Accelerator]

The composition may further contain a curing accelerator.

In particular, in a case where the composition contains a precursor of the resin binder, it is preferable to contain a curing accelerator for forming the resin binder from the precursor of the resin binder.

The kind of the curing accelerator to be used may be appropriately determined in consideration of the kind of the precursor of the resin binder and the like.

Examples of the curing accelerator include triphenylphosphine, a boron trifluoride-amine complex, and the compound described in paragraph 0052 of JP2012-67225A. In addition to the curing accelerators, examples thereof include imidazole-based curing accelerators such as 2-methylimidazole (trade name; 2MZ), 2-undecylimidazole (trade name; C11-Z), 2-heptadecylimidazole (trade name; C17Z), 1,2-dimethylimidazole (trade name; 1.2DMZ), 2-ethyl-4-methylimidazole (trade name; 2B4MZ), 2-phenylimidazole (trade name; 2PZ), 2-phenyl-4-methylimidazole (trade name; 2P4MZ), 1-benzyl-2-methylimidazole (trade name; 1B2MZ), I-benzyl-2-phenylimidazole (trade name; 1B2PZ), 1-cyanoethyl-2-methylimidazole (trade name; 2MZ-CN), 1-cyanoethyl-2-undecylimidazole (trade name; C11Z-CN), I-cyanoethyl-2-phenylimidazolium trimellitate (trade name; 2PZCNS-PW), 2,4-diamino-6-[2'-methylimidazolyl-(1')]-ethyl-s-triazine (trade name; 2MZ-A), 2,4-diamino-6-[2'-undecylimidazolyl-(1')]-ethyl-s-triazine (trade name; C11Z-A), 2,4-diamino-6-[2'-ethyl-4'-methylimidazolyl-(1')]-ethyl-s-triazine (trade name; 2E4MZ-A), 2,4-diamino-6-[2'-methylimidazolyl-(1')]-ethyl-s-triazine isocyanuric acid adduct (trade name; 2MA-OK), 2-phenyl-4,5-dihydroxymethylimidazole (trade name; 2PHZ-PW), 2-phenyl-4-methyl-5-hydroxymethylimidazole (trade name; 2P4MHZ-PW), 1-cyanoethyl-2-phenylimidazole (trade name; 2PZ-CN), 2,4-diamino-6-[2'-methylimidazolyl-(1')]-ethyl-s-triazine (trade name; 2MZA-PW), and 2,4-diamino-6-[2'-methylimidazolyl-(1')]-ethyl-s-triazine isocyanuric acid adduct (trade name; 2MAOK-PW) (all produced by SHIKOKU CHEMICALS CORPORATION). Further, examples of triarylphosphine-based curing accelerator include the compound described in paragraph 0052 of JP2004-43405A. Examples of the phosphorus-based curing accelerator to which triphenylborane is added to triarylphosphine include the compound described in paragraph 0024 of JP2014-5382A.

One kind of the curing accelerators may be used singly, or two or mom kinds thereof may be used.

For example, in a case of containing an epoxy compound, the content of the curing accelerator of the composition is preferably 0.01% to 10% by volume, and more preferably 0.10% to 5% by volume, with respect to the total amount of the epoxy compound.

[Solvent]

The composition may further contain a solvent.

A kind of the solvent is not particularly limited, and an organic solvent is preferable. Examples of the organic solvent include cyclopentanone, cyclohexanone, ethyl acetate, methyl ethyl ketone, dichloromethane, and tetrahydrofuran.

In a case where the composition contains a solvent, a content of the solvent is preferably an amount such that the concentration of the solid content in the composition is 20% to 90% by volume, more preferably an amount such that the concentration is 30% to 80% by volume, and even more preferably an amount such that the concentration is 40% to 60% by volume.

[Other Components]

The composition may contain other components other than the aforementioned component.

Examples of other components include a dispersant, an inorganic substance other than the boron nitride particles according to the embodiment of the present invention (may be boron nitride particles not corresponding to the boron nitride particles according to the embodiment of the present invention), the boron nitride particles according to the embodiment of the present invention and a surface modifier that modifies a surface of an inorganic substance other than the boron nitride particles according to the embodiment of the present invention, and a polymerization initiator (photopolymerization initiator, thermal polymerization initiator, and the like).

[Method for Producing Composition]

A method for producing a composition is not particularly limited, known methods can be adopted, and for example, the composition can be produced by mixing the aforementioned various components.

In a case of mixing, the various components may be mixed at a time or mixed sequentially.

A method for mixing the components is not particularly limited, and known methods can be used. A mixing device used for the mixing is preferably a submerged disperser, and examples thereof include a rotating and revolving mixer, a stirrer such as a high-speed rotating shear-type stirrer, a colloid mill, a roll mill, a high-pressure injection-type disperser, an ultrasonic disperser, a beads mill, and a homogenizer. One kind of the mixing devices may be used singly, or two or mom kinds thereof may be used. A deaeration treatment may be performed before and after the mixing and/or simultaneously with the mixing.

[Method for Curing Composition]

The composition according to the embodiment of the present invention is subjected to a curing treatment to obtain a thermally conductive material.

A method for curing the composition is not particularly limited, but a thermosetting reaction is preferable.

A heating temperature during the thermosetting reaction is not particularly limited. For example, the heating temperature may be appropriately selected within the range of 50° C. to 250° C. Moreover, in a case where the thermosetting reaction is performed, a heating treatment at different temperatures may be performed a plurality of times.

The curing treatment is preferably performed on the composition which is formed in a film shape or a sheet shape. Specifically, for example, the composition may be applied to form a film, and a curing reaction may be performed.

In a case where the curing treatment is performed, it is preferable to apply the composition onto a substrate to form a coating film, and then cure the coating film. In this case, after further bringing the coating film formed on the substrate into contact with another substrate, the curing treatment may be performed. A cured product (thermally conductive material) obtained after the curing may or may not be separated from one or both of the substrates.

Furthermore, in a case where the curing treatment is performed, after applying the composition onto different substrates to form respective coating films, the curing treatment may be performed in a state where the obtained coating films are in contact with each other. A cured product (thermally conductive material) obtained after the curing may or may not be separated from one or both of the substrates.

At a time of the curing treatment, press working may be performed. A press used for press working is not limited, and for example, a flat plate press may be used, or a roll press may be used.

In a case where the roll press is used, for example, it is preferable that a substrate with a coating film, which is obtained by forming a coating film on a substrate, is sandwiched between a pair of rolls in which two rolls face each other, and while rotating the pair of rolls to cause the substrate with a coating film to be passed, pressure is applied in a film thickness direction of the substrate with a coating film. In the substrate with a coating film, a substrate may be present on only one surface of a coating film, or a substrate may be present on both surfaces of a coating film. The substrate with a coating film may be passed through the roll press only once or a plurality of times.

Only one of the treatments by the flat plate press and the treatment by the roll press may be carried out, or both may be carried out.

In addition, the curing treatment may be completed at a time point when the composition is in a semi-cured state. The thermally conductive material according to the embodiment of the present invention in a semi-cured state may be disposed so as to be in contact with the device or the like to be used, then further cured by heating and the like, and the main curing may be performed. It is also preferable that the device and the thermally conductive material according to the embodiment of the present invention adhere to each other by heating and the like at the time of the main curing.

Regarding the preparation of the thermally conductive material including a curing reaction, "Highly Thermally Conductive Composite Material" (CMC Publishing CO., LTD, written by Yoshitaka TAKEZAWA) can be referred to.

A shape of the thermally conductive material is not particularly limited, and the thermally conductive material can be molded into various shapes according to the use. Examples of a typical shape of the molded thermally conductive material include a sheet shape.

That is, the thermally conductive material according to the embodiment of the present invention is preferably a thermally conductive sheet.

Further, the thermally conductive properties of the thermally conductive material according to the embodiment of the present invention may be anisotropic or isotropic.

The thermally conductive material preferably has insulating properties (electrical insulating properties). In other words, the composition according to the embodiment of the present invention is preferably a thermally conductive insulating composition.

For example, a volume resistivity of the thermally conductive material at 23° C. and a relative humidity of 65% is preferably $10^{10}$ Ω·cm or greater, more preferably $10^{12}$ Ω·cm or greater, and even more preferably $10^{14}$ Ω·cm or greater. An upper limit thereof is not particularly limited, but is generally $10^{18}$ Ω·cm or less.

[Use of Thermally Conductive Material]

The thermally conductive material can be used as a heat dissipation material such as a beat dissipation sheet, and can be used for dissipating heat from various devices. More specifically, a device with a thermally conductive layer is prepared by disposing a thermally conductive layer, which contains the thermally conductive material according to the embodiment of the present invention, on a device, and thus the heat generated from the device can be efficiently dissipated by the thermally conductive layer.

The thermally conductive material has sufficient thermally conductive properties and high heat resistance, and thus is suitable for dissipating heat from a power semiconductor device used in various electrical machines such as a personal computer, a general household electric appliance, and an automobile.

In addition, the thermally conductive material has sufficient thermally conductive properties even in a semi-cured state, and thus can also be used as a heat dissipation material which is disposed in a portion where light for photocuring is hardly reached, such as a gap between members of various devices. Moreover, the thermally conductive material also has excellent adhesiveness, and thus can also be used as an adhesive having thermally conductive properties.

The thermally conductive material may be used in combination with members other than the members formed of the present composition.

For example, a sheet-shaped thermally conductive material (thermally conductive sheet) may be combined with a sheet-shaped support in addition to the layer formed of the present composition.

Examples of the sheet-shaped support include a plastic film, a metal film, and a glass plate. Examples of a material for the plastic film include polyester such as polyethylene terephthalate (PET), polycarbonate, an acrylic resin, an epoxy resin, polyurethane, polyamide, polyolefin, a cellulose derivative, and silicone. Examples of the metal film include a copper film.

EXAMPLES

Hereinafter, the present invention will be described in more detail based on Examples. The materials, the amount and proportion of the materials used, the details of treatments, the procedure of treatments, and the like shown in the following Examples can be appropriately changed within a range that does not depart from the gist of the present invention. Accordingly, the scope of the present invention is not limitedly interpreted by the following Examples.

[Boron Nitride Particles]

Boron nitride particles used in each Example or Comparative Example were prepared by the methods shown below.

[Material Name]

Boron nitride particles used in each Example or Comparative Example were prepared by subjecting the following materials (boron nitride, both commercially available products) to the treatments described below. Alternatively, the material itself shown below was used as the boron nitride particles in Comparative Example.

Boron Nitride A (average particle diameter: 42 μm, shape: aggregated, specific surface area: 2 $m^2/g$)

Boron nitride B (average particle diameter: 20 μm, shape: aggregated, specific surface area: 4 $m^2/g$)

Boron nitride C (average particle diameter: 45 μm, shape: flat plate, specific surface area: 0.5 $m^2/g$)

[Treatment Conditions]

Treatment was performed on boron nitride (any of the aforementioned boron nitrides A to C) under any of the treatment conditions shown below.

In a case where the treatment was performed under any treatment conditions, the average particle diameter, shape, and specific surface area of the produced boron nitride particles were not substantially changed from the boron nitride before the treatment.

<Vacuum Plasma Treatment 1 (Treatment Strength 300 W)>

Vacuum plasma treatment (gas type: $O_2$, pressure: 30 Pa, flow rate: 10 sccm, output: 300 W) was performed for a treatment time described in the table shown in the latter part on 150 g of boron nitride using "YHS-DΦS" produced by SAKIGAKE Semiconductor Co., Ltd.

<Vacuum Plasma Treatment 2 (Treatment Strength 500 W)>

Vacuum plasma treatment (gas type: 02, pressure: 30 Pa, output: 500 W) was performed on 15 g of boron nitride using "Plaza Cleaner PDC210" produced by Yamato Scientific Co., Ltd. The boron nitride to be treated was stirred every 5 minutes of the vacuum plasma treatment, and the vacuum plasma treatment was performed until the total treatment time reached the treatment time described in the table shown in the latter part.

<Atmospheric Pressure Plasma Treatment>

Atmospheric pressure plasma treatment (gas type: $O_2/Ar=1/9$) (volume ratio), pressure: 1,000 to 1,100 Pa, output: 150 W) was performed for the treatment time described in the table shown in the latter part on 100 g of boron nitride using "PLASMA DRUM" produced by J-Science Lab Co., Ltd.

<Underwater Plasma Treatment>

Boron nitride was added to an aqueous solution containing sodium chloride to prepare a dispersion containing boron nitride. After putting the obtained dispersion in a beaker, a plasma generation electrode was inserted, a high frequency pulse voltage is applied, and a plasma treatment of generating plasma was performed for 1 hour under the following plasma treatment conditions. After the plasma treatment, the obtained dispersion was filtered and separated into a filtrate and a filtration product. By vacuum drying the collected powder (the filtration product), boron nitride particles subjected to underwater plasma treatment were obtained.

—Plasma Treatment Conditions—

Current/Voltage Conditions

Voltage application frequency: 80 kHz

Peak voltage: ±2 kV

Peak current: ±4A

Pulse width: 0.5 μsec

Distance between electrodes: 3.8 mm

Dispersion medium: 0.01% by mass sodium chloride aqueous solution 70 mL

Stirring speed: 400 rpm

Plasma treatment time: 60 minutes

<Baking Treatment>

Boron nitride was heated in the air at 1,000° C. for the treatment time described in the table shown in the latter part using "FP410" produced by Yamato Scientific Co., Ltd.

[Atomic Concentration Ratio (XPS O/B Ratio and the Like)]

Each of the oxygen atomic concentration, the boron atomic concentration, and the silicon atomic concentration (units are all atomic %) on the surface of the boron nitride particles was measured under the aforementioned conditions in the specification using an X-ray photoelectron spectrometer (ULVAC-PHI: Versa Probe II).

From the obtained results, an atomic concentration ratio (oxygen atomic concentration/boron atomic concentration) of the oxygen atomic concentration to the boron atomic concentration on the surface of the boron nitride particles was calculated.

In addition, the atomic concentration ratio (oxygen atomic concentration/silicon atomic concentration) of the silicon atomic concentration to the boron atomic concentration on the surface of the boron nitride particles was calculated.

[D Value (XRD Peak Ratio) Obtained by Equation (1)]

X-ray diffraction measurement was performed on the boron nitride particles, and the D value was obtained by Equation (1).

$$D\ value=B(OH)_3(002)/BN(002) \quad \text{Equation (1)}$$

$B(OH)_3(002)$: Peak strength derived from a (002) plane of boron hydroxide having a triclinic space group measured by X-ray diffraction.

BN(002): Peak strength derived from the (002) plane of boron nitride having a hexagonal space group measured by X-ray diffraction.

The table shown in the latter part shows the characteristics of the boron nitride particles used in each Example or Comparative Example.

[Composition]

The composition (composition for forming a thermally conductive material) was prepared using the aforementioned boron nitride particles.

The characteristics of the composition and the test methods carried out using the composition are shown below.

[Various Components]

The various components used in the compositions of each Example and Comparative Example are shown below.

Since the boron nitride particles are as described above, the description thereof is omitted.

<Binder Resin or Precursor Thereof (Binder Component)>

The binder resin or a precursor thereof (binder component) used in Examples and Comparative Examples is shown below.

The following A-1 and A-2 correspond to epoxy compounds, and B-1 and B-2 correspond to phenolic compounds.

A-1

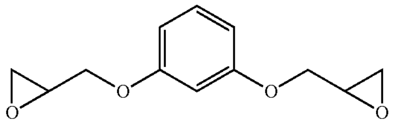

A-2

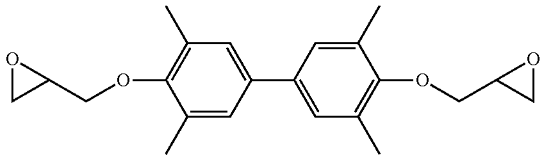

B-1

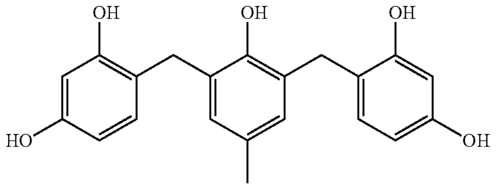

B-2

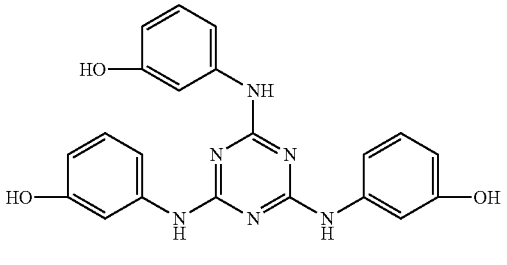

<Curing Accelerator>

$PPh_3$ (triphenylphosphine) was used as a curing accelerator.

<Solvent>

Cyclopentanone was used as the solvent.

[Preparation of Composition]

A mixture in which the combinations of the binder components (binder resin or a precursor thereof) shown in the table below were blended in equivalent amounts (an amount in which the number of epoxy groups of the epoxy compound in the system is equivalent to the number of hydroxyl groups of the phenolic compound) was prepared.

After mixing the mixture, solvent, and curing accelerator in this order, boron nitride particles were added to obtain a mixture solution. The obtained mixture solution was treated for 5 minutes with a rotating and revolving mixer (produced by THINKY CORPORATION, AWATORI RENTARO ARE-310) to obtain a composition (composition for forming a thermally conductive material) of each Example or Comparative Example.

The addition amount of the solvent was set such that the concentration of the solid content in the composition was 42.5% by volume.

An addition amount of the curing accelerator was set such that the content of the curing accelerator in the composition was 3% by volume with respect to the content of the epoxy compound.

The total content of the binder component (epoxy compound and phenolic compound) and the curing accelerator in the composition was adjusted such that the total content (% by volume) of the binder component and the component derived from the curing accelerator with respect to the total volume of the thermally conductive material (thermally conductive sheet) to be formed was 37.0% by volume.

The total content (% by volume) of the binder component and the curing accelerator with respect to the total mass of the solid content in the composition is substantially the same as the total content of the components derived from the binder component and the curing accelerator with respect to the total volume of the thermally conductive material (thermally conductive sheet) to be formed.

The content of the boron nitride particles in the composition is adjusted so that the content (% by volume) of the boron nitride particles with respect to the total volume of the thermally conductive material (thermally conductive sheet) to be formed is 63.0% by volume.

The content (% by volume) of the boron nitride particles with respect to the total mass of the solid content in the composition is substantially the same as the content (% by volume) of the boron nitride particles with respect to the total volume of the thermally conductive material (thermally conductive sheet) to be formed.

[Evaluation]

[Viscosity X]

The epoxy compound and the phenolic compound in each composition were blended so that the equivalent ratio of the hydroxyl groups contained in the phenolic compound (the number of hydroxyl groups/the number of epoxy groups) to the epoxy groups contained in the epoxy compound is 1, and each powder was ground in a dairy pot and mixed well. The viscosity of the obtained mixture was measured in a range of 100° C. to 180° C. using RheoStress RS6000 (produced by EKO INSTRUMENTS CO., LTD), and the viscosity at 120° C. was read. The temperature rising rate was measured as 3° C./min, and the shear rate was measured as 10 (1/s).

The measured viscosity value (viscosity X) was classified and evaluated in light of the following criteria.

(Evaluation Criteria)

"A": 1 Pa·s or less

"B": greater than 1 Pa·s and 10 Pa·s or less

"C": greater than 10 Pa·s

In addition, all the viscosities X were 0.001 Pa·s or greater.

[Thermally Conductive Properties]

A composition having the blending described in the table shown in the latter part of each Example and each Comparative Example was uniformly applied onto a release surface of a release-treated polyester film by using an applicator, and left to stand at 120° C. for 5 minutes to obtain a coating film.

A new polyester film was further laminated on the coating film of the film with a coating film thus obtained so that the release surfaces face each other to obtain a laminate having a configuration of "polyester film-coating film-polyester film".

The laminate was subjected to roll-press treatment. The laminate after the roll press was heat-treated under air (treated at a hot plate temperature of 180° C. and a pressure of 20 MPa for 5 minutes, and then under normal pressure at 180° C. for 90 minutes). The polyester films on both surfaces of the laminate were peeled off to obtain a thermally conductive sheet (cured coating film, average film thickness 200 μm).

Evaluation of thermally conductive properties was carried out using each thermally conductive sheet (thermally conductive material) obtained by using each composition. The thermal conductivity was measured by the following method, and the thermally conductive properties were evaluated according to the following criteria.

<Measurement of Thermal Conductivity (W/m·k) in Film Thickness Direction>

(1) Using "LFA467" produced by NETZSCH Japan K. K., the thermal diffusivity in a thickness direction of the thermally conductive material was measured by a laser flash method.

(2) The specific gravity of the thermally conductive material was measured by the Archimedes method (using the "solid specific gravity measuring kit") using the balance "XS204" produced by Mettler Toledo.

(3) Using "DSC320/6200" produced by Seiko Instruments Inc., the specific heat of the thermally conductive material at 25° C. was determined under a temperature rising condition of 10° C./min.

(4) The obtained thermal diffusivity was multiplied by the specific gravity and the specific heat to calculate the thermal conductivity of the thermally conductive material in the film thickness direction.

(Evaluation Criteria)

The measured thermal conductivity was classified according to the following criteria, and the thermally conductive properties in the film thickness direction were evaluated.

"A": 15 W/m·K or greater
"B": 10 W/m·K or greater and less than 15 W/m·K
"C": 8 W/m·K or greater and less than 10 W/m·K
"D": Less than 8 W/m·K <Measurement of Thermal Conductivity (W/m·k) in In-Plane Direction>

(1) Using the "Thermowave Analyzer TA" produced by Bethel, the thermal diffusivity of the thermally conductive material in the in-plane direction was measured by a periodic heating radiation temperature measurement method.

(2) The specific gravity of the thermally conductive material was measured by the Archimedes method (using the "solid specific gravity measuring kit") using the balance "XS204" produced by Mettler Toledo.

(3) Using "DSC320/6200" produced by Seiko Instruments Inc., the specific heat of the thermally conductive material at 25° C. was determined under a temperature rising condition of 10° C./min.

(4) The obtained thermal diffusivity was multiplied by the specific gravity and the specific heat to calculate the thermal conductivity of the thermally conductive material in the in-plane direction.

(Evaluation Criteria)

The measured thermal conductivity was classified according to the following criteria, and the thermally conductive properties in the in-plane direction were evaluated.

"A": 40 W/m·K or greater
"B": Less than 40 W/m·K

[Peel Strength (Copper Foil Peel Adhesiveness)]

An aluminum base substrate with a copper foil was prepared using the composition of each Example or each Comparative Example by a method shown below, and the following peel test was performed on the obtained aluminum base substrate with a copper foil to evaluate the peel strength of the thermally conductive sheet.

(Preparation of Aluminum Base Substrate with Copper Foil)

A composition having the blending described in the table shown in the latter part of each Example and each Comparative Example was uniformly applied onto a release surface of a release-treated polyester film by using an applicator, and left to stand at 120° C. for 5 minutes to obtain a coating film.

A new polyester film was further laminated on the coating film of the film with a coating film thus obtained so that the release surfaces face each other to obtain a laminate having a configuration of "polyester film-coating film-polyester film".

The laminate was subjected to roll-press treatment. The polyester films were peeled off from both surfaces of the laminate after roll press, the remaining coating film was sandwiched between an aluminum plate and a copper foil, and hot-pressed in the air (treated at a hot plate temperature of 180° C. and a pressure of 20 MPa for 5 minutes, and then further treated at 180° C. under normal pressure for 90 minutes) to obtain an aluminum base substrate with a copper foil. The aluminum base substrate with a copper foil is a specimen in which a copper foil and an aluminum base substrate are adhered to each other via a thermally conductive sheet layer (cured coating film, average film thickness of 200 μm).

[Peel Strength]

A copper foil peel strength of the obtained aluminum base substrate with a copper foil was measured according to the method for measuring the peel strength under normal conditions described in JIS C 6481.

In addition, when the peel strength was measured, the form of fracture was aggregate fracture in the thermally conductive sheet layer formed from the composition.

(Evaluation Criteria)

The measured peel strength was classified according to the following criteria, and the adhesiveness was evaluated.

"A+": 5 N/cm or greater
"A": 4 N/cm or greater and less than 5 N/cm
"B": 3 N/cm or greater and less than 4 N/cm
"C": 2.5 N/cm or greater and less than 3 N/cm
"D": Less than 2.5 N/cm

[Sheet Filling Rate]

The thermally conductive sheet prepared by the method shown in the [thermally conductive properties] section was cut into a size of 10 mm×10 mm, the density of the thermally conductive sheet was measured by the Archimedes method, and the value was defined as the film density ($g/cm^3$).

The filling rate (%) of the thermally conductive sheet was determined from Equation (X) using the film density obtained by the evaluation method.

$$\text{Filling rate (\%)} = \text{film density}/\text{theoretical density} \times 100 \quad \text{Formula (X)}$$

The theoretical density is an ideal density of the thermally conductive sheet assuming a case where the thermally conductive sheet is formed without including a gap (void) or the like. Specifically, the theoretical density was calculated by calculating from blending of the solid content of the composition, with the density of the boron nitride particles being 2.23 g/cm$^3$ and the density of the other components being 1.30 g/cm$^3$.

[Result]

The table below shows the characteristics of the boron nitride particles, the characteristics of the blending of the composition, and the test results in each Example or Comparative Example.

Table 1 shows the characteristics of the boron nitride particles, the characteristics of the blending of the composition, and test results in Examples or Comparative Examples in which the thermal conductivity in the film thickness direction was measured, in the measurement of the thermal conductivity of the thermally conductive material (thermally conductive sheet).

Table 2 shows the characteristics of the boron nitride particles, the characteristics of the blending of the composition, and test results in Examples or Comparative Examples in which the thermal conductivity in the in-plane direction was measured, in the measurement of the thermal conductivity of the thermally conductive material (thermally conductive sheet).

In the table, the "boron nitride treatment conditions" column shows what kind of treatment was performed on the boron nitride used as the material. The description of "vacuum P1" in the "treatment conditions" column shows that the vacuum plasma treatment 1 was performed. The description of "vacuum P2" shows that the vacuum plasma treatment 2 was performed. The description of "atmospheric pressure P" shows that the atmospheric pressure plasma treatment was performed. The description of "underwater P" shows that the underwater plasma treatment was performed. The description of "baking" shows that the baking treatment was performed. The description of "untreated" shows that the boron nitride shown as the material was used as the boron nitride particles as they are without performing any treatment.

The "parameters of boron nitride particles" column shows the characteristics of the boron nitride particles used in the preparation of the composition of each Example or Comparative Example. The "XPS O/B ratio" column shows the atomic concentration ratio of the oxygen atomic concentration to the boron atomic concentration detected by analyzing the surface of the boron nitride particles by XPS (X-ray photoelectron spectroscopy). The "XRD peak ratio" column shows the D value obtained by the aforementioned Formula (I).

The "binder component" column shows the kinds of epoxy compounds and phenolic compounds used in the preparation of the composition of each Example or Comparative Example, and the viscosity X of the binder component (viscosity X is as described above).

In Comparative Example 5, the obtained thermally conductive material (thermally conductive sheet) was too brittle to evaluate the peel strength.

In Comparative Example 6, the thermally conductive sheet could not be formed.

In any of the boron nitride particles used in preparation of the composition of each Example or Comparative Example, the silicon atomic concentration on the surface of the boron nitride particles was less than a detection limit. That is, the atomic concentration ratio (oxygen atomic concentration/silicon atomic concentration) of the silicon atomic concentration to the boron atomic concentration on the surface of the boron nitride particles is 0.001 or less in any of the boron nitride particles used in preparation of the composition of each Example or Comparative Example.

TABLE 1

| | Boron nitride particles | | | | | | | |
|---|---|---|---|---|---|---|---|---|
| | Material | | | | Treatment conditions of boron nitride | | Parameters of boron nitride particles | |
| | Kind | Shape | Particle diameter [μm] | Specific surface area [m$^2$/g] | Treatment conditions | Treatment time [h] | XPS O/B ratio | XRD peak ratio |
| Example 1 | Boron nitride A | Aggregate | 42 | 2 | Vacuum P2 | 0.75 | 0.21 | 0.005 |
| Example 2 | Boron nitride A | Aggregate | 42 | 2 | Vacuum P2 | 0.5 | 0.20 | 0.003 |
| Example 3 | Boron nitride A | Aggregate | 42 | 2 | Vacuum P1 | 2 | 0.20 | 0.002 |
| Example 4 | Boron nitride A | Aggregate | 42 | 2 | Vacuum P2 | 1 | 0.21 | 0.007 |
| Example 5 | Boron nitride A | Aggregate | 42 | 2 | Vacuum P2 | 0.25 | 0.18 | 0.002 |
| Example 6 | Boron nitride A | Aggregate | 42 | 2 | Vacuum P1 | 1 | 0.16 | 0.001 |
| Example 7 | Boron nitride A | Aggregate | 42 | 2 | Vacuum P1 | 0.5 | 0.14 | 0.000 |
| Example 8 | Boron nitride A | Aggregate | 42 | 2 | Atmospheric pressure P | 6 | 0.12 | 0.001 |
| Example 9 | Boron nitride B | Aggregate | 20 | 4 | Vacuum P1 | 1 | 0.16 | 0.003 |
| Example 10 | Boron nitride B | Aggregate | 20 | 4 | Vacuum P1 | 2 | 0.29 | 0.007 |
| Example 11 | Boron nitride A | Aggregate | 42 | 2 | Vacuum P1 | 2 | 0.20 | 0.002 |

TABLE 1-continued

| | | | | | | | | |
|---|---|---|---|---|---|---|---|---|
| Example 12 | Boron nitride A | Aggregate | 42 | 2 | Vacuum P1 | 2 | 0.20 | 0.002 |
| Comparative Example 1 | Boron nitride A | Aggregate | 42 | 2 | Untreated | — | 0.02 | 0.000 |
| Comparative Example 2 | Boron nitride A | Aggregate | 42 | 2 | Atmospheric pressure P | 3 | 0.11 | 0.003 |
| Comparative Example 3 | Boron nitride A | Aggregate | 42 | 2 | Underwater P | 1 | 0.07 | 0.000 |
| Comparative Example 4 | Boron nitride A | Aggregate | 42 | 2 | Vacuum P1 | 0.15 | 0.08 | 0.000 |
| Comparative Example 5 | Boron nitride A | Aggregate | 42 | 2 | Baking | 1 | 0.21 | 0.015 |
| Comparative Example 6 | Boron nitride A | Aggregate | 42 | 2 | Baking | 2 | 0.38 | 0.046 |

| | Binder component | | | Sheet | Evaluation result | |
|---|---|---|---|---|---|---|
| | Epoxy compound Kind | Phenolic compound Kind | Viscosity X | filling rate [%] | Thermal conductivity (film thickness direction) | Peel strength |
| Example 1 | A-1 | B-1 | A | 96 | A | A |
| Example 2 | A-1 | B-1 | A | 96 | A | A |
| Example 3 | A-1 | B-1 | A | 97 | A | A |
| Example 4 | A-1 | B-1 | A | 93 | B | A |
| Example 5 | A-1 | B-1 | A | 95 | A | B |
| Example 6 | A-1 | B-1 | A | 99 | A | B |
| Example 7 | A-1 | B-1 | A | 98 | A | C |
| Example 8 | A-1 | B-1 | A | 99 | A | C |
| Example 9 | A-1 | B-1 | A | 99 | B | C |
| Example 10 | A-1 | B-1 | A | 97 | B | B |
| Example 11 | A-1 | B-2 | C | 90 | C | A |
| Example 12 | A-2 | B-1 | B | 92 | B | A |
| Comparative Example 1 | A-1 | B-1 | A | 99 | A | D |
| Comparative Example 2 | A-1 | B-1 | A | 98 | A | D |
| Comparative Example 3 | A-1 | B-1 | A | 98 | A | D |
| Comparative Example 4 | A-1 | B-1 | A | 98 | A | D |
| Comparative Example 5 | A-1 | B-1 | A | 91 | D | Evaluation impossible |
| Comparative Example 6 | A-1 | B-1 | A | 79 | Film formation impossible | |

TABLE 2

| | Boron nitride particles | | | | | | | |
|---|---|---|---|---|---|---|---|---|
| | Material | | | | Treatment conditions of boron nitride | | Parameters of boron nitride particles | |
| | Kind | Shape | Particle diameter [μm] | Specific surface area [$m^2/g$] | Treatment conditions | Treatment time [h] | XPS O/B ratio | XRD peak ratio |
| Example 14 | Boron nitride C | Flat plate | 45 | 0.5 | Vacuum P1 | 2 | 0.28 | 0.005 |
| Comparative Example 6 | Boron nitride C | Flat plate | 45 | 0.5 | Untreated | — | 0.06 | 0.000 |

TABLE 2-continued

| | Binder component | | | Sheet | Evaluation result | |
|---|---|---|---|---|---|---|
| | | | | | Thermal conductivity | |
| | Epoxy compound Kind | Phenolic compound Kind | Viscosity X | filling rate [%] | (film thickness direction) | Peel strength |
| Example 14 | A-1 | B-1 | A | 96 | A | C |
| Comparative Example 6 | A-1 | B-1 | A | 99 | A | D |

From the results shown in the table, it was confirmed that a thermally conductive material having excellent thermally conductive properties and peel strength can be obtained by using the composition containing the boron nitride particles according to the embodiment of the present invention.

Among them, it was confirmed that in a case where the atomic concentration ratio of the oxygen atomic concentration to the boron atomic concentration detected by analysis of the boron nitride particles by XPS is 0.15 (more preferably 0.20) or greater, the peel strength of the obtained thermally conductive material is more excellent (refer to comparisons of Examples 1 to 8 and the like).

It was confirmed that in a case where the D value of the boron nitride particles is 0.005 or less, the thermally conductive properties of the obtained thermally conductive material are more excellent (refer to comparisons of Examples 1 to 4 and the like).

It was confirmed that in a case where an average particle diameter of the boron nitride particles is 40 μm or greater, the effect of the present invention is more excellent (refer to comparison between Examples 6 and 9, comparison between Examples 4 and 10, and the like).

It was confirmed that in a case where the viscosity X of the binder component is 10 Pa·s or less (preferably 1 Pa·s or less), the thermally conductive properties of the obtained thermally conductive material is more excellent (refer to comparison of Examples 3, 11, and 12 and the like).

What is claimed is:

1. Boron nitride particles in which an atomic concentration ratio of an oxygen atomic concentration to a boron atomic concentration on a surface, detected by X-ray photoelectron spectroscopy, is 0.12 or greater, and a D value obtained by Equation (1) is 0.001 or greater and 0.010 or less, $$D\ value = B(OH)_3(002)/BN(002) \quad \text{Equation (1)}$$

$B(OH)_3(002)$: Peak strength derived from a (002) plane of boron hydroxide having a triclinic space group measured by X-ray diffraction BN(002): Peak strength derived from the (002) plane of boron nitride having a hexagonal space group measured by X-ray diffraction.

2. The boron nitride particles according to claim 1, wherein the D value is 0.005 or less.

3. The boron nitride particles according to claim 1, wherein the atomic concentration ratio is 0.15 or greater.

4. The boron nitride particles according to claim 1, wherein the atomic concentration ratio is 0.25 or less and 0.12 or greater.

5. The boron nitride particles according to claim 1, wherein an average particle diameter of the boron nitride particles is 40 μm or greater.

6. The boron nitride particles according to claim 1, wherein the boron nitride particles are aggregated particles.

7. The boron nitride particles according to claim 1, wherein the boron nitride particles are formed by applying oxygen plasma treatment to boron nitride.

8. A composition for forming a thermally conductive material comprising:

the boron nitride particles according to claim 1; and a resin binder or a precursor of the resin binder.

9. The composition for forming a thermally conductive material according to claim 8, wherein the resin binder or the precursor of the resin binder contains an epoxy compound.

10. The composition for forming a thermally conductive material according to claim 8, wherein the resin binder or the precursor of the resin binder contains an epoxy compound and a phenolic compound.

11. A thermally conductive material which is obtained by curing the composition for forming a thermally conductive material according to claim 8.

12. A thermally conductive sheet made of the thermally conductive material according to claim 11.

13. A device with a thermally conductive layer comprising:

a device; and a thermally conductive layer including the thermally conductive sheet according to claim 12 disposed on the device.

14. The boron nitride particles according to claim 2, wherein the atomic concentration ratio is 0.15 or greater.

15. The boron nitride particles according to claim 2, wherein the atomic concentration ratio is 0.25 or less and 0.12 or greater.

16. The boron nitride particles according to claim 2, wherein an average particle diameter of the boron nitride particles is 40 μm or greater.

17. The boron nitride particles according to claim 2, wherein the boron nitride particles are aggregated particles.

18. The boron nitride particles according to claim 2, wherein the boron nitride particles are formed by applying oxygen plasma treatment to boron nitride.

19. A composition for forming a thermally conductive material comprising:

the boron nitride particles according to claim 2; and a resin binder or a precursor of the resin binder.

20. The composition for forming a thermally conductive material according to claim 19, wherein the resin binder or the precursor of the resin binder contains an epoxy compound.

21. The boron nitride particles according to claim 1, wherein the atomic concentration ratio is 0.15 or greater and 0.18 or less.

22. The boron nitride particles according to claim 1, wherein an average particle diameter of the boron nitride particles is 40 μm or greater and 60 μm or less.

* * * * *